Jan. 27, 1953     T. F. ESERKALN     2,626,540
THREE-DIMENSIONAL ENGRAVING AND THE LIKE REPRODUCING MACHINE
Filed Nov. 15, 1947     11 Sheets-Sheet 2

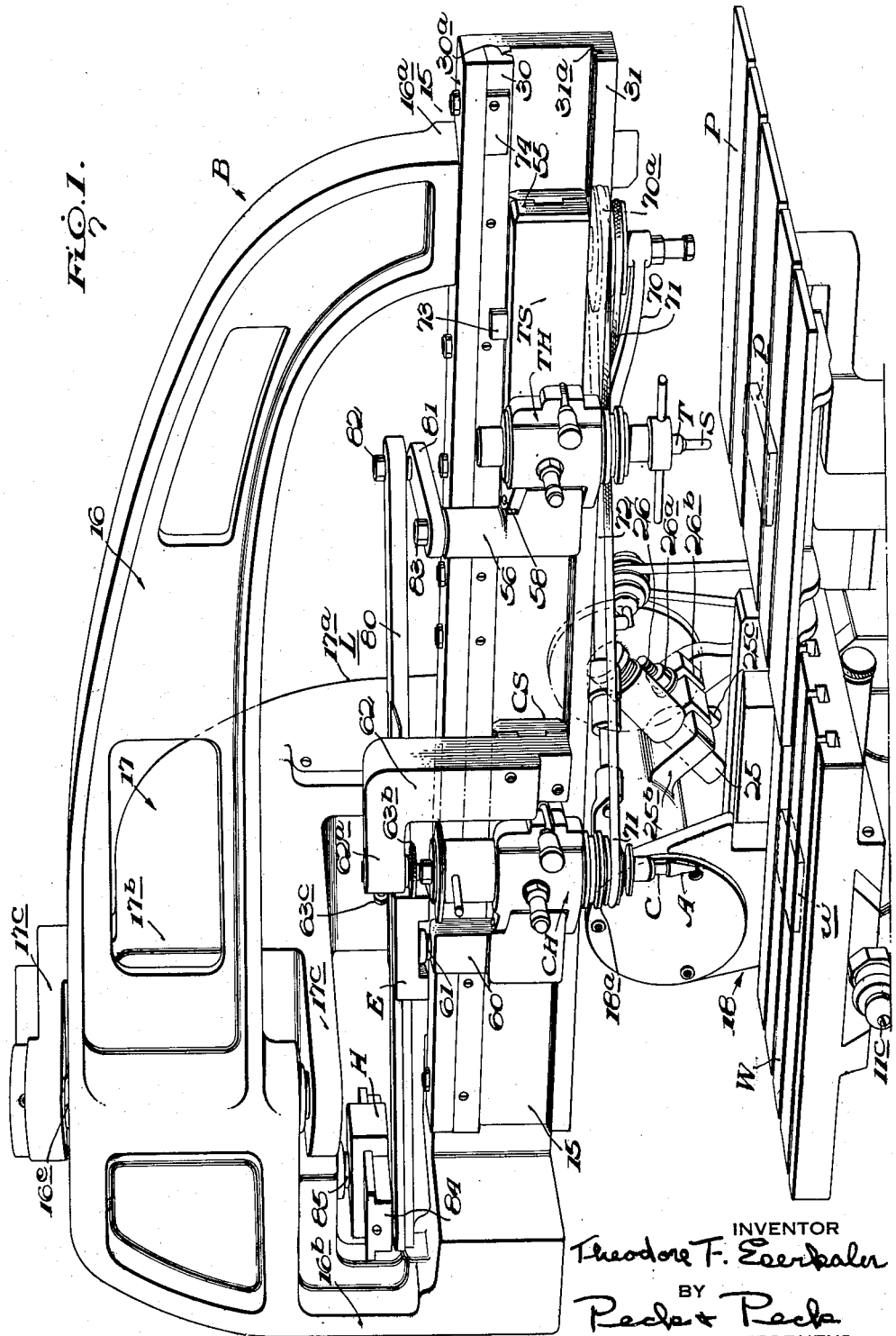

Inventor
Theodore F. Eserkaln
By Peck & Peck
Attorneys

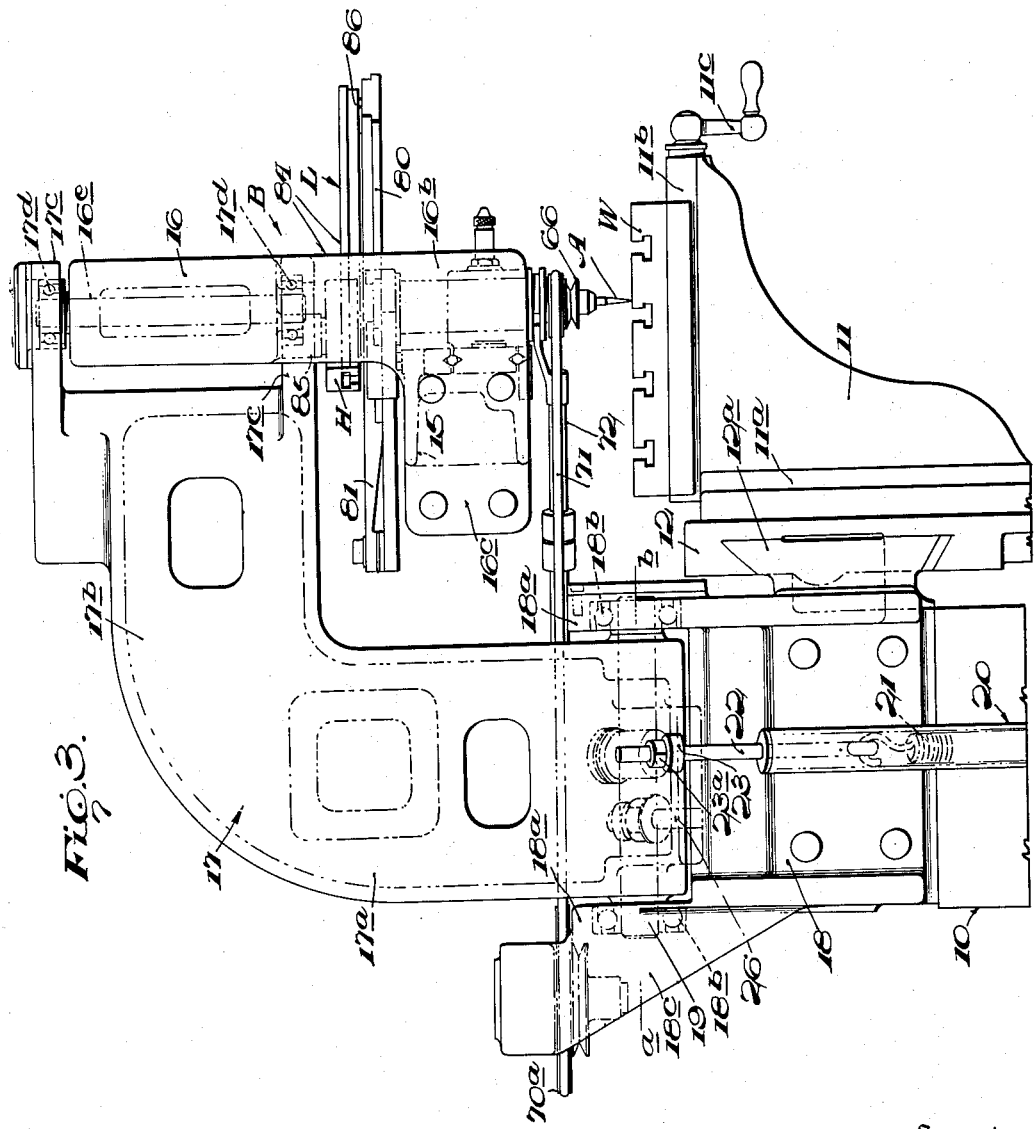

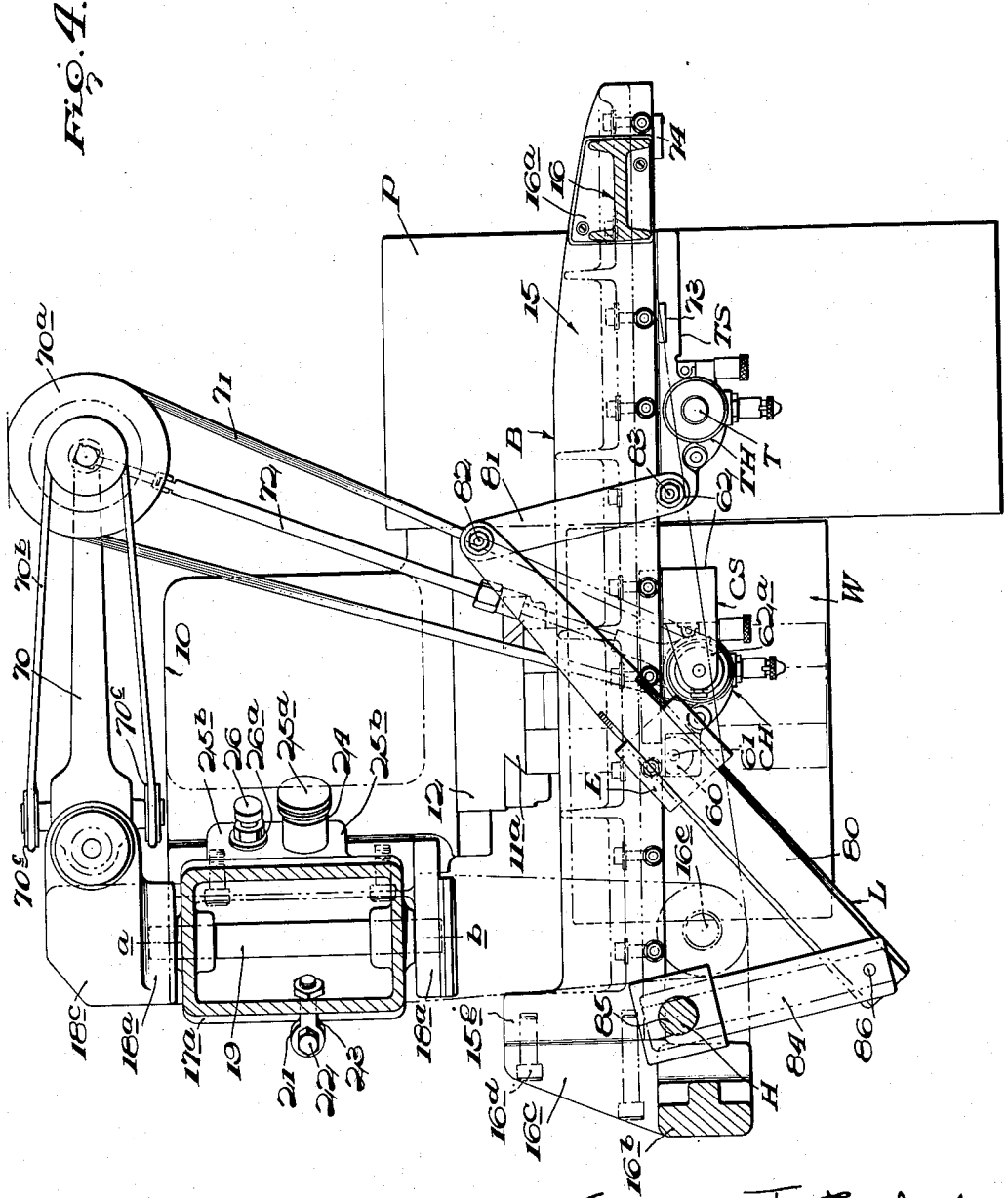

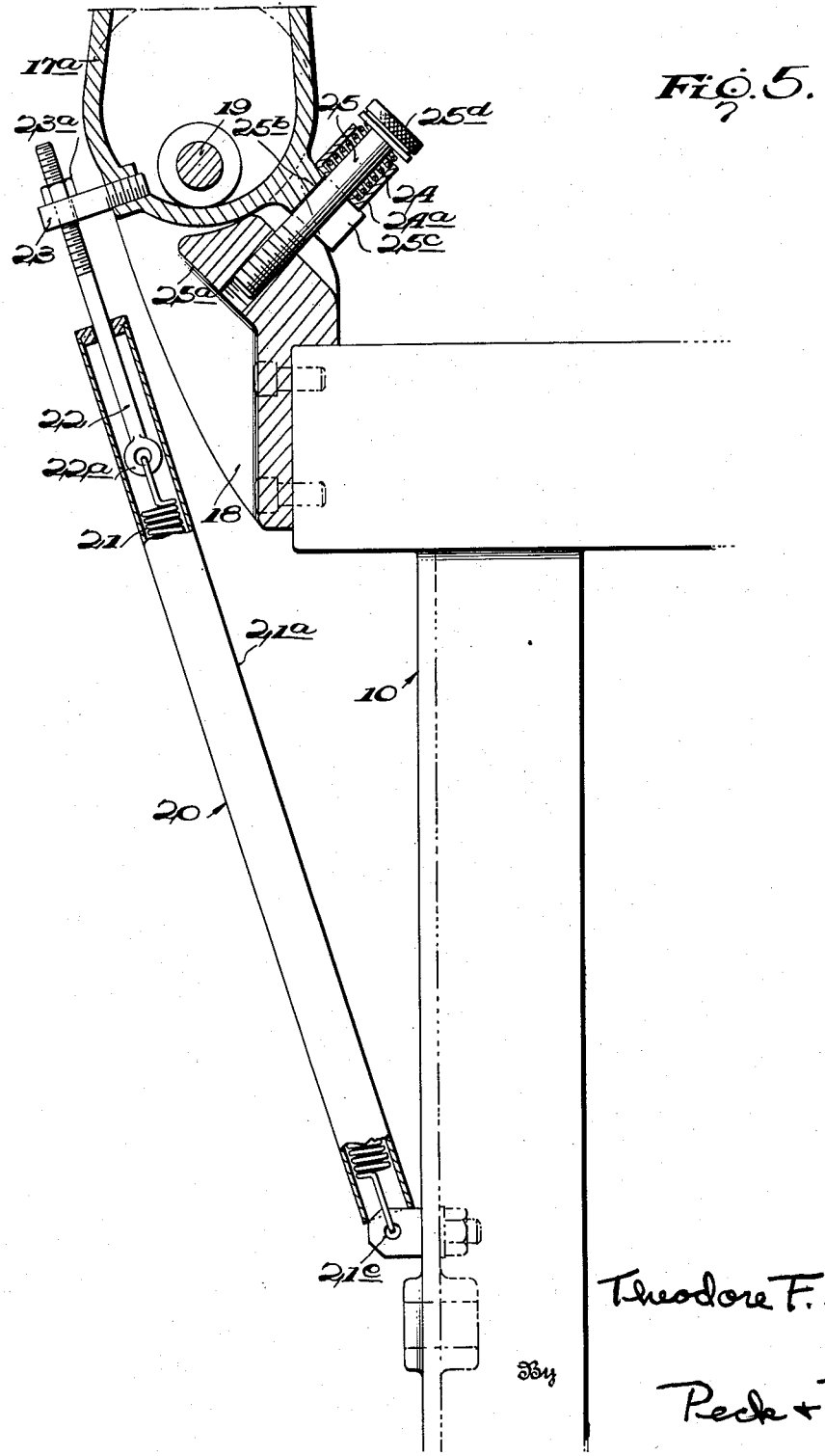

Jan. 27, 1953 T. F. ESERKALN 2,626,540
THREE-DIMENSIONAL ENGRAVING AND THE LIKE REPRODUCING MACHINE
Filed Nov. 15, 1947 11 Sheets-Sheet 6
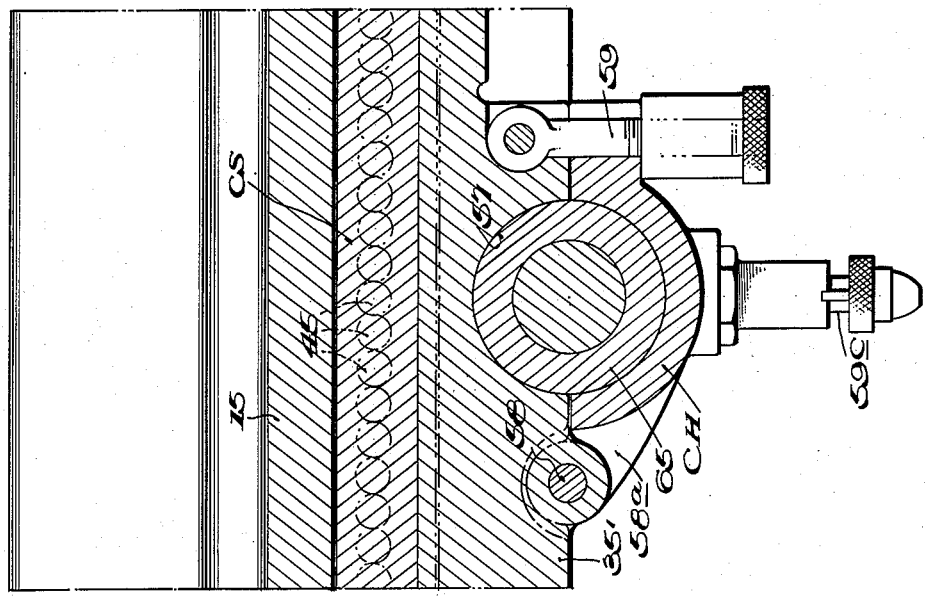
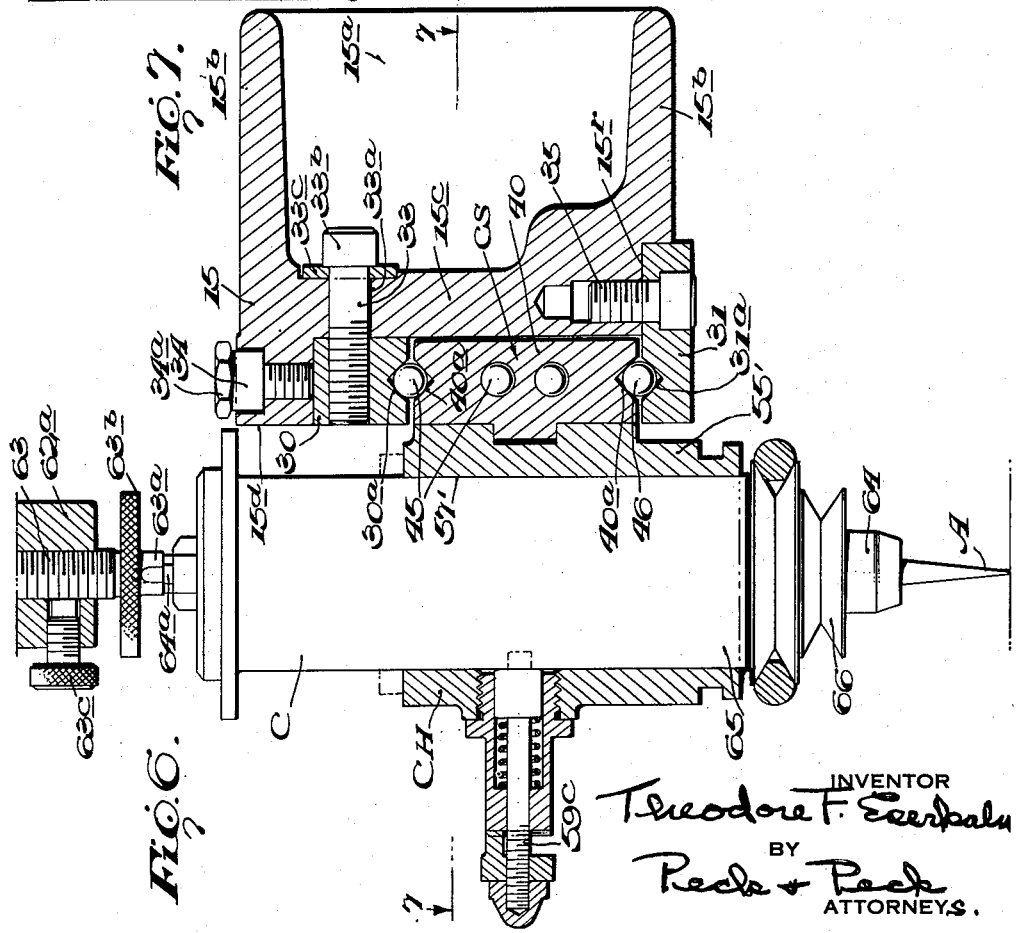
INVENTOR
Theodore F. Eserkaln
BY
Peck + Peck
ATTORNEYS.

Jan. 27, 1953 T. F. ESERKALN 2,626,540
THREE-DIMENSIONAL ENGRAVING AND THE LIKE REPRODUCING MACHINE
Filed Nov. 15, 1947 11 Sheets-Sheet 7
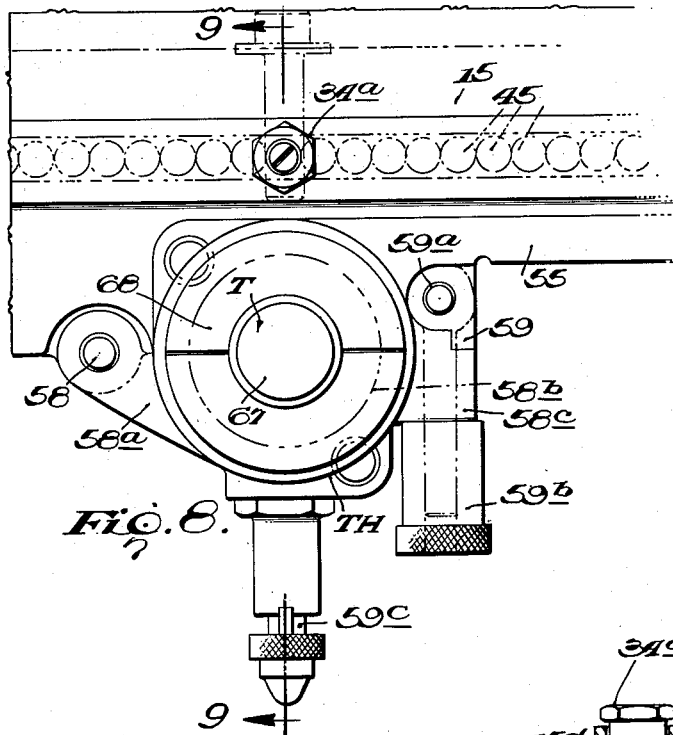
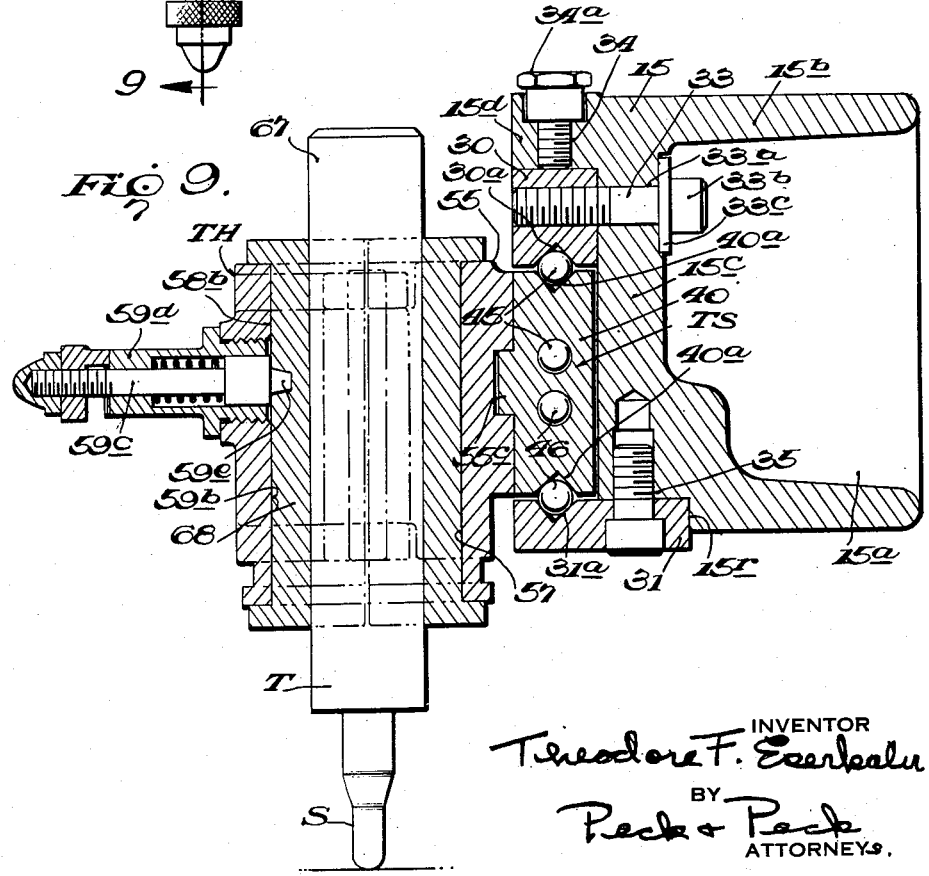
INVENTOR
Theodore F. Eserkaln
BY
Peck & Peck
ATTORNEYS.

Jan. 27, 1953 T. F. ESERKALN 2,626,540
THREE-DIMENSIONAL ENGRAVING AND THE LIKE REPRODUCING MACHINE
Filed Nov. 15, 1947 11 Sheets-Sheet 8
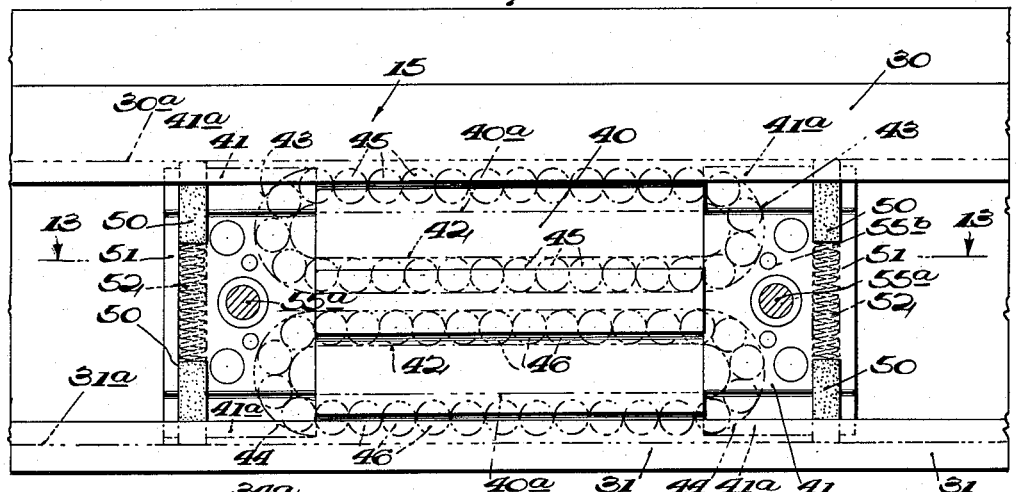
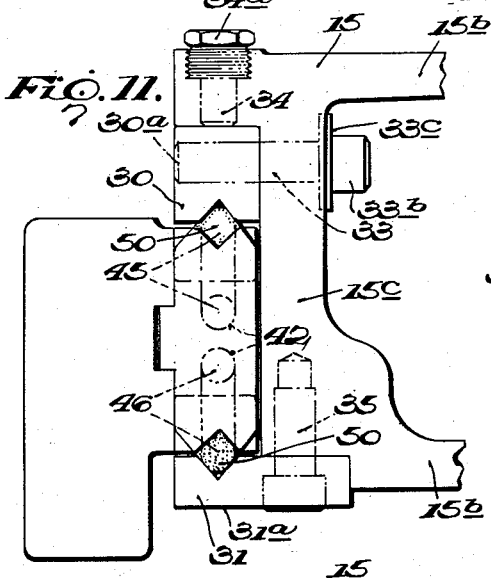
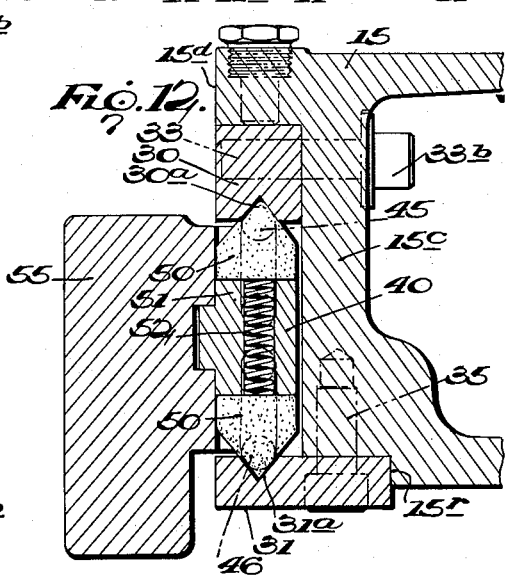
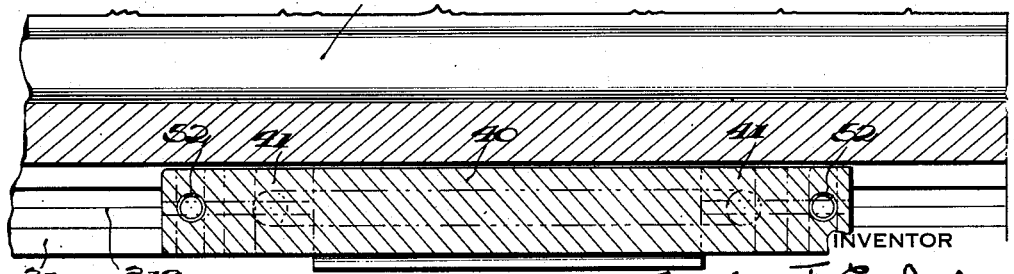
INVENTOR
Theodore F. Eserkaln
BY
Peck & Peck
ATTORNEYS.

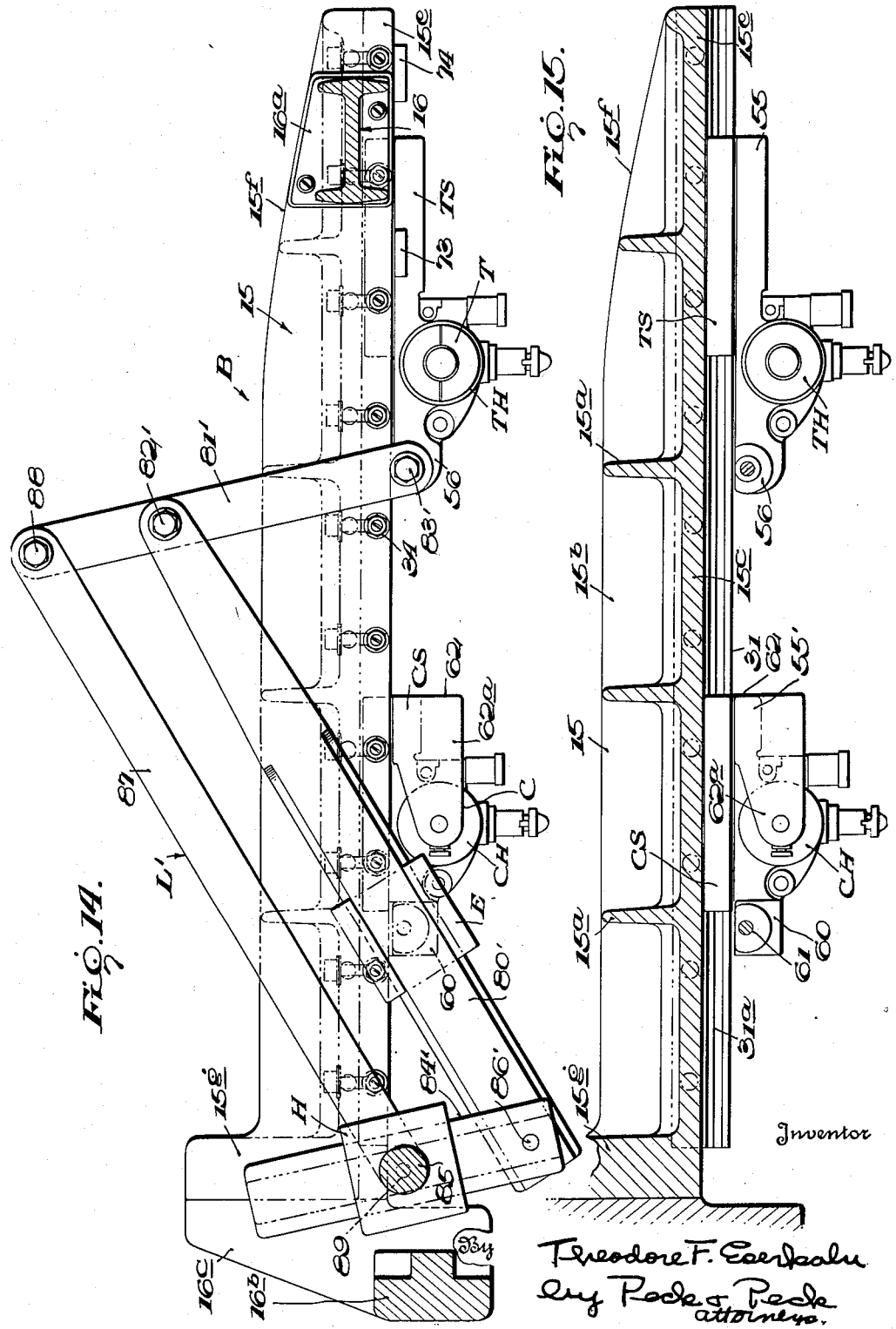

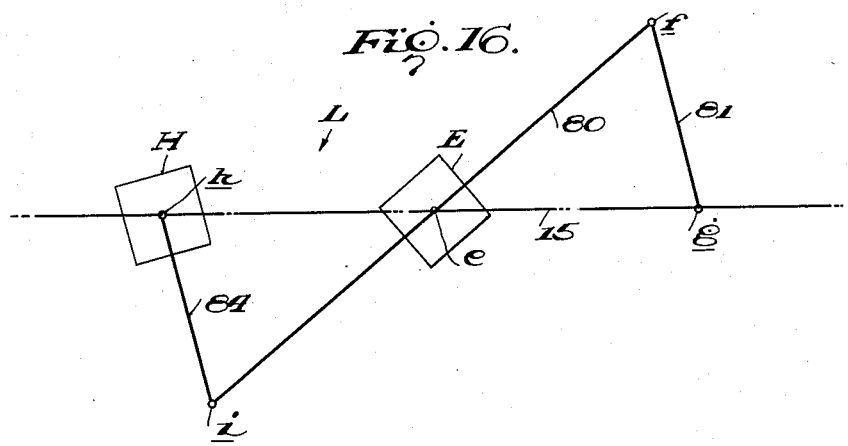
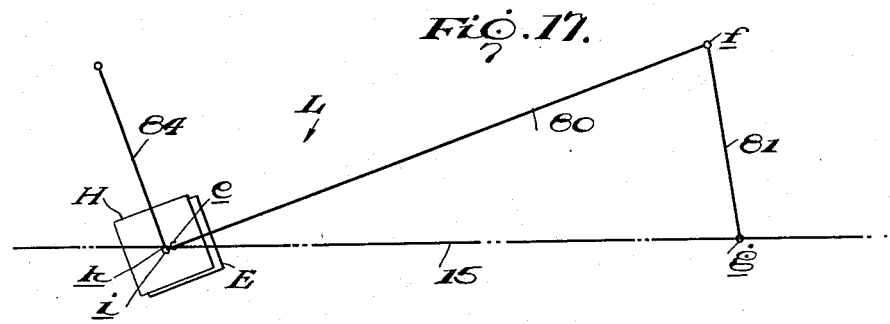
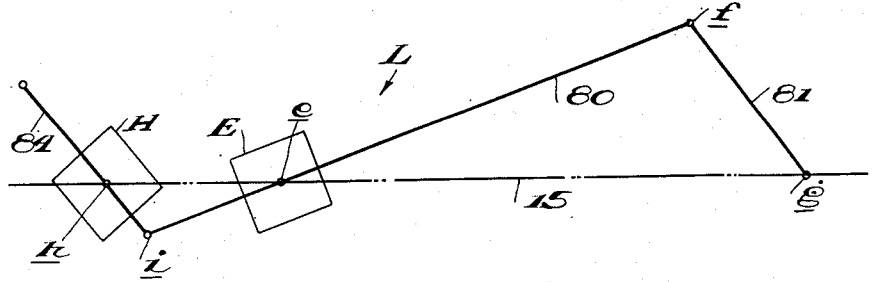

Jan. 27, 1953   T. F. ESERKALN   2,626,540
THREE-DIMENSIONAL ENGRAVING AND THE LIKE REPRODUCING MACHINE
Filed Nov. 15, 1947   11 Sheets-Sheet 11
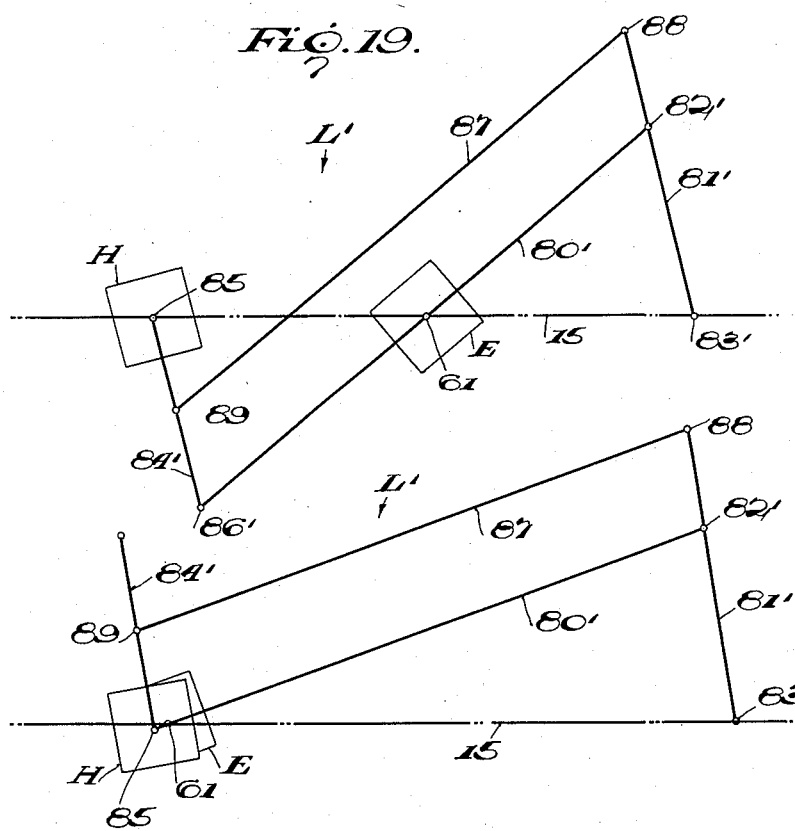
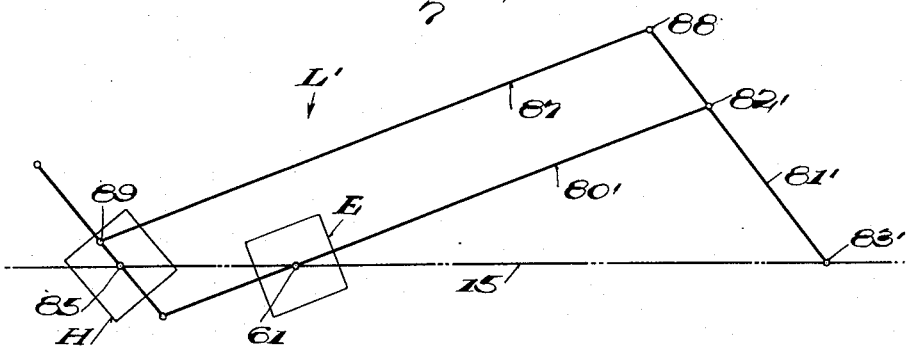
INVENTOR.
Theodore F. Eserkaln
BY
Peck + Peck
Attorneys.

Patented Jan. 27, 1953　　　　　　　　　　　　　　　　　　　　　　　　2,626,540

UNITED STATES PATENT OFFICE 2,626,540

THREE-DIMENSIONAL ENGRAVING AND THE LIKE REPRODUCING MACHINE

Theodore F. Eserkaln, Wauwatosa, Wis., assignor to George Gorton Machine Co., Racine, Wis., a corporation of Wisconsin Application November 15, 1947, Serial No. 786,264

7 Claims. (Cl. 90—13.1)

This invention relates particularly to three-dimensional engraving or reproducing machines and the nature and objects of the invention will be readily recognized and understood by those skilled in the arts involved in the light of the following explanation and detailed description of the accompanying drawings illustrating what I now consider to be the preferred embodiments or mechanical expressions of my invention from among various other forms, expressions, embodiments, arrangements, modifications, designs, constructions and combinations, of which the invention is capable within the broad spirit and scope thereof as defined by the hereinafter appended claims.

The so-called "pantograph" types of engraving or reproducing machines in commercial use for various three-dimensional engraving and reproducing operations, usually include in the organization thereof, the conventional forms of pantograph mechanism, and the standard or "stock" engraving machines of such type are designed for general three-dimensional engraving or other reproducing operations on relatively small work pieces from a pattern or master. In order to meet the cost and size requirements imposed on such types of machine, the machine must be of relatively compact, simple structural and mechanical design and have overall dimensions and weights within the maximum limits for such general type or class of machine tools, as will be familiar to those skilled in this art.

The inherent structural, mechanical and functional characteristics of the types and designs of such classes of three-dimensional engraving or reproducing machines are such that the ratios of reduction or enlargement which are possible with such a machine are within very limited ranges. The maximum reduction or enlargement ratio possible for such types of three-dimensional machines generally does not exceed a ratio of the order of approximately 10:1, and in many instances the maximum reduction or enlargement ratio possible is of a much lower order, say of the order of 8:1. And in three-dimensional reproduction, the limitation on the reduction or enlargement ratio in any one dimension necessarily requires the same limitation of the other dimension or dimensions in order to reproduce a true scaled reproduction in three dimensions in the work from the pattern or master. Hence, in a machine for three-dimensional engraving or reproduction, it is of no avail if a movement transmitting or pantograph mechanism is utilized which may be capable of reduction or enlargement ratios of greater magnitudes in one or two of the three dimensions because the mechanism must be limited to reduction or enlargement ratios in such dimension or dimensions, by the maximum ratio possible in the other dimension or dimensions. Due to the limited range of scaled reduction and enlargement engraving or reproducing operations possible with such limited range machines, they are not available for use and cannot be used for a wide field of engraving or reproducing operations in which high reduction or enlargement ratios are either required, or are highly desirable or preferable in order to attain the increased efficiency and the marked advantages from decreased reproduction errors compared with a machine having a limited range of reduction or enlargement ratios.

My present invention is primarily directed toward eliminating in the general "pantograph" types of three-dimensional engraving or reproducing machines, and particularly those within the general size ranges of the standard or "stock" types of machines, the limitations on the ranges of reduction or enlargement ratios within which such a machine may be adjusted for precise and efficient operation; and a main object is to provide a three-dimensional reproducing machine having a design of movement transmitting mechanism for transmitting movement in accurately scaled relation to the reproducing tool from the tracer, which is such that the machine will be infinitely adjustable within a range of reduction or enlargement ratios between a minimum ratio approaching the order of 1:1, say for example, of orders of approximately 1½:1 to 2:1, and infinity, with maximum ratios of the orders of 100:1 and higher, thus made practically and efficiently attainable.

A further object is to provide such a machine having such wide ranges of reduction or enlargement ratios within which the machine is infinitely adjustable, in which, within the limits of the pattern capacity of any particular machine, the size and area of the pattern or master which can be efficiently traced by the tracer for accurate and precise reproducing operations is in no way affected or limited by the magnitude of the reduction or enlargement for which the movement transmitting or pantograph mechanism of the invention is adjusted and set.

Another object is to provide such a machine which is equally capable of efficient operation for two-dimensional work or three-dimensional work at the option of the operator and without any changes, modifications or adjustments in the machine, other than the necessary adjustments of the movement transmitting or pantograph mechanism as required for the desired reduction or enlargement ratio at which the machine is to be operated.

And in carrying out such main objects, I have invented and developed a movement transmitting or pantograph type mechanism of extremely simple structural and mechanical character which while providing for such wide ranges of reproduction ratios will be compact and capable of being constructed within such overall dimension limits as to enable the mechanism to be efficiently utilized to provide engraving or reproducing machine organizations in the smaller size as well as in the larger or unlimited size ranges.

Another object is to provide a movement transmitting or pantograph type mechanism having the above general characteristics in which adjustment of the mechanism in all three (3) or in the two (2) lateral dimensions, for a desired reduction or enlargement ratio may be effected solely by adjusting the relationship between the tracer and the cutter on and independently of the major, bodily movable structure of the mechanism for the selected ratio, through the medium of a pantograph linkage arrangement which adjustably controls and determines the relative movements in scaled relation of the cutter and tracer on the major structure.

A further object is to provide a form and mounting of such a pantograph linkage for operatively associating the cutter unit and the tracer unit with each other and with the major structure of the pantograph mechanism, by which the linkage may be adjusted and set to any reduction or enlargement ratio within the capacity of the machine, from a single adjustment point.

A further object of such a design and arrangement of pantograph mechanism is to so mount the tracer unit and the cutter unit on the pattern and work table side of the pantograph structure for straight line movements of these units on and independently of the structure and relative to each other, for transmitting movements in scaled relation between the tracer and cutter, so that the effect of the shifting weights resulting from tracer and cutter unit movements will be maintained at a minimum in order to increase the sensitivity and controlability of the operations of the pantograph mechanism, particularly where large areas are being covered.

Another object is to provide an adjusting mechanism for the cutter head or unit by which the cutter spindle of the unit may be adjusted axially to a desired "depth" setting; and further to so design and arrange such adjusting mechanism that it will be removable so as to permit of mounting a forming guide in operative association with the cutter spindle of the cutter unit for performing reproducing operations on a curved surface from a flat pattern or master.

And another general object is to provide an improved type of pantograph mechanism which while particularly adapted as the movement transmitting mechanism of an engraving or reproducing machine for moving a reproducing tool in scaled relation to a tracer, is also capable of general adaptation and use to and with any organization where it may be desired or required to move one member from another member in precisely scaled relation to the movements of such other member.

With the foregoing, as well as certain other objects, features and results in view which will be readily apparent from the following explanation and detailed description, my invention consists in certain novel features in design, construction and arrangement and in the mounting, association and combination of elements and organizations, all as well be more fully and particularly referred to and specified hereinafter.

Referring to the accompanying drawings in which similar reference characters refer to corresponding parts and elements throughout the several figures thereof.

Fig. 1 is a perspective view of a three-dimensional engraving machine embodying my present invention, taken from the front of the machine with the portions of the machine, including the supporting column structure below the work table and pattern table and table adjusting mechanisms, not being shown.

Fig. 2 is a view in front elevation of the three-dimensional engraving machine of Fig. 1, but including portions of the supporting column structure and table adjusting mechanisms.

Fig. 3 is a view in end or side elevation taken from the left hand side when facing the machine, showing the pivotal mounting of the link unit on which the beam structure is mounted and carried, together with a portion of the adjustable spring unit for counterbalancing the weight of the beam structure about the pivotal axis of the link unit.

Fig. 4 is a top plan view of the machine of Figs. 1 to 3, with the hanger bar of the beam structure and pivotally mounted link member on which the beam structure is mounted removed, portions of the hanger bar and link member being shown in horizontal, transverse section.

Fig. 5 is a detailed view partly in vertical section, showing the adjustable spring arrangement for counterbalancing the weight of the beam structure and associated mechanism carried thereby.

Fig. 6 is a vertical transverse section through the beam member and reciprocating cutter unit slide or carriage and the cutter unit mounting bracket thereon, the cutter unit being shown in side elevation; and also showing a portion of the removable mechanism for vertically adjusting and setting the vertical position of the rotary cutter spindle in the cutter unit.

Fig. 7 is a horizontal transverse section taken as on the line 7—7 of Fig. 6.

Fig. 8 is a top plan view of the tracer unit in mounted position on the reciprocal slide or carriage mounted on the beam member of the pantograph structure.

Fig. 9 is a vertical transverse section taken as on the line 9—9 of Fig. 8, and showing particularly the adapter bushing of the tracer unit with the unit mounted in its bracket structure on the reciprocating carriage.

Fig. 10 is a view in side elevation of a reciprocating carriage for a cutter unit or a tracer unit, the tracer unit or cutter unit mounting bracket structure having been removed.

Fig. 11 is an end elevation of the slide or carriage of Fig. 10, with the base of a cutter unit or tracer unit mounting bracket structure being shown in mounted position thereon.

Fig. 12 is a vertical transverse section through the pantograph beam, carriage and mounting bracket base as shown in Fig. 11.

Fig. 13 is a longitudinal, horizontal sectional view taken as on the line 13—13 of Fig. 10.

Fig. 14 is a top plan view of a four link arrangement of pantograph linkage of the invention in mounted position on and relative to the beam member and the reciprocating cutter and tracer unit carriages mounted on such beam member, the hanger bar or overarm of the beam structure having been removed.

Fig. 15 is a horizontal section longitudinally through the beam member of the beam structure of the pantograph mechanism of either the linkage form of Figs. 1 to 4, or the linkage form of Fig. 14, and showing the reciprocating cutter and tracer carriages in mounted position on the beam member and with the cutter and tracer units, respectively, mounted thereon, the carriages and units being shown in top plan.

Figs. 16, 17, and 18, are schematic views illustrating certain adjustment positions of the three-link pantograph linkage of the form shown in Figs. 1 to 4 inclusive; Fig. 16 indicating the adjusted position for the minimum reduction ratio; Fig. 17 the adjusted position for a high reduction ratio approaching infinity, say of the order of 100:1; and Fig. 18, the approximate adjusted position for a reduction ratio of the order of 4:1.

Figs. 19, 20, and 21, are schematic views generally similar to Figs. 16, 17 and 18, but showing various positions of adjustment of the four link form of pantograph mechanism of Fig. 14, with Fig. 19 indicating the position of adjustment for the minimum reduction ratio; Fig. 20 the position of adjustment for a high reduction ratio approaching infinity, say of the order of 100:1; and Fig. 21 the position of adjustment for a ratio of approximately 4:1.

A movement transmitting or pantograph mechanism embodying my invention is particularly adapted as a mechanism for moving the tracer and cutter of an engraving machine organization, in three dimensions for three-dimensional engraving or reproducing operations, and I have selected for purposes of illustrating and explaining the principles and basic features of the invention, a design and arrangement thereof embodied in and forming a part of a three-dimensional engraving machine organization of the general class such as typified, for example, by the engraving machines disclosed in the U. S. Patents Nos. 1,881,500, October 11, 1932, to George Gorton; 1,964,319, of July 26, 1934, to George Gorton; 2,128,611, of August 30, 1938, to Henkes; and 2,161,709, of June 6, 1939, to Henkes. However, the invention is not restricted or limited to a form and expression thereof presented by the selected example, nor is it limited to either the types or classes, as to either size or design and construction, of the engraving machines disclosed in the above referred to patents, but, is adapted to any application thereof in any organization where it may be found useful in transmitting movements from one element to another, whether or not such organization is of the engraving or other types of reproducing machine.

In the selected example of a three-dimensional engraving machine embodying my invention, referring now to Figs. 1, 2, 3, and 4 of the accompanying drawings, the machine includes a vertically disposed column structure 10, with a horizontally disposed work table W and a horizontally disposed copy or pattern table P adjustably supported from such column structure 10 in position disposed at and across the forward side of the machine when facing the machine from the operator's station. The work table W is mounted for vertical movements to adjust the position vertically thereof, and is mounted for horizontal adjustment along a straight line path longitudinally of the machine and for horizontal adjustment along a straight line path perpendicular to the aforesaid straight line path of longitudinal movements, for transverse or "in and out" adjustment relative to the machine. The copy table P is mounted for vertical movements to adjusted positions vertically relative to the machine and also for movements horizontally to adjusted positions laterally relative to the work table W.

For example, work table W may be mounted on a knee 11 which is mounted and supported by means of a vertical slideway 11a of dovetail cross section on a base slide 12, which slide is mounted for horizontal movements longitudinally of the machine on a suitable slideway 12a of the usual dovetail cross section supported from the column structure 10. The upper side of the knee 11, provides a horizontal slideway 11b, disposed transversely relative to the machine, such slideway being of the usual dovetail cross section, and the work table W is slidably mounted thereon for movements "in and out" or transverse of the machine along a straight line horizontal path perpendicular to the straight line path of movement of the table longitudinally of the machine on the slideway 12a. Thus, work table W may be vertically adjusted by any suitable actuating and adjusting mechanism (not shown) to move the table on the vertical slideway 11a; may be moved horizontally along a straight line path longitudinally of the machine on the slideway 12a, by any suitable actuating and adjusting mechanism (not shown); and may be moved horizontally along a straight line path perpendicular to the path of longitudinal movement, that is, transversely or "in and out" relative to the machine, by a suitable actuating and adjusting mechanism for moving the table on the knee slideway 11b, which mechanism includes an operating crank handle 11c. These various above referred to actuating and adjusting mechanisms for the work table W may be of any usual types and constructions familiar in the art.

The copy table P is mounted and supported on the upper end of a rod or post 14. The copy table supporting post 14 is slidably mounted in vertically disposed position in a bracket structure 14a for raising and lowering to adjust the vertical position of table P, through the medium of an actuating screw 14b operated by a hand crank 14c at the lower end of the screw. The bracket structure 14a with the copy table P vertically adjustably mounted thereon, is suitably supported from column structure 10 and is mounted for lateral movements in a horizontal plane for adjusting the position of table P relative to the work table W, in a general manner familiar in this art. Thus, the copy or pattern table P may be adjusted vertically and horizontally relative to any vertical or horizontal position of adjustment of the work table W.

The movement transmitting or pantograph organization as expressed in the herein illustrated example of engraving machine of the invention by which a tracer T and a reproducing tool or cutter C of the engraving machine are moved in accurate scaled relation in three dimensions, includes as a basic and primary component, a body in the form of a beam structure B on which the tracer T and the cutter C are mounted and by which they are positioned in operative relation with a pattern p on copy table P and a work piece w on work table W, respectively. The beam structure B is mounted in generally horizontally disposed position longitudinally of the machine over and across the copy table P and work table W and, as will be hereinafter explained, is mounted for bodily swinging in a horizontal plane and in a vertical plane about axes, respectively, provided at one end thereof, in this instance, at the left hand side or end of the machine when facing the machine from the operating position. The tracer T is mounted on the beam structure B in position above copy table P for scanning or tracing movements over the pattern $p$, and the cutter C is mounted on this beam structure in position over the work table W for pattern reproducing engagement with the work piece $w$ mounted on the work table. The movements of tracer T and cutter C in scaled relation in the so-called third or "depth" dimension are, in this instance, obtained by vertical swinging of the beam structure B bodily about a horizontal axis, while the movements of tracer T and cutter C in scaled relation in one of the horizontal or lateral dimensions is obtained by swinging of beam structure B horizontally about a vertical axis, and in the other horizontal or lateral dimension by movements of the tracer and cutter horizontally and longitudinally on and independently of the beam structure in scaled relation relative to each other.

The beam structure of the movement transmitting mechanism

The beam structure B in the particular structural and mechanical expression thereof for the engraving machine of this example, includes a beam member 15 which is suspended or hung in horizontally disposed position over and across copy table P and work table W, from an overarm or hanger bar 16, of generally arched form which is positioned over and above beam 15 and is secured at its opposite ends to the adjacent opposite ends, respectively, of beam 15, as will be clear by reference to Figs. 1 and 2.

In this instance, the beam 15, referring now to Figs. 1, 7, 14 and 15, is formed of a suitable light weight metal or metal alloy, such for example as aluminum or an alloy thereof, and is of general U or channel beam shape in cross section with transverse strengthening webs 15a at spaced intervals along the length of the beam between the opposite side flanges 15b thereof (see Fig. 15). The base, in this instance, the vertically disposed, forward wall 15c of beam 15, is provided with a horizontally disposed, forwardly extending flange 15d (see Figs. 6 and 9) disposed longitudinally therealong throughout the major length of the beam with the forward side or face of base wall 15c presenting a flat, uninterrupted vertical surface extending between the opposite ends of the beam.

The beam 15 is mounted in generally horizontally disposed position with the base wall 15c thereof disposed vertically at the forward side of the beam when facing the machine and with the opposite side walls or flanges 15b disposed horizontally and extending rearwardly from the rear side of the beam. In order to reduce the weight at the outer free end 15e of the beam 15 and to provide such outer end portion as of reduced width, the rear edge portions of the upper and lower horizontally disposed flange walls 15b may be bevelled or inclined forwardly and outwardly toward the outer free end 15e, of the beam as indicated at 15f, in Figs. 14 and 15. The inner end of beam 15, opposite the outer free end 15e thereof, is provided with a vertically disposed mounting base 15g positioned transversely or laterally relative to the beam and being extended from the inner side across and a distance rearwardly beyond the spaced upper and lower flange walls 15b of the beam (see Figs. 14 and 15). In this instance, mounting base 15g is cast or formed integral with the body of beam 15.

The beam 15 is mounted and secured at its opposite ends to the opposite ends, respectively, of the generally upwardly arched overarm or hanger bar 16, so that, beam 15 is hung and suspended from opposite ends of the hanger bar in horizontally disposed position therebelow with the beam throughout the major length thereof unobstructed by the hanger bar positioned thereabove, as will be clear by reference to Figs. 1 and 2. This hanger bar 16 is of general I-beam cross section (see Figs. 4 and 14, in connection with Figs. 1 and 2), and at its outer free end curves downwardly to and is provided with a base 16a which is suitably attached to beam 15 in position secured on the upper side of the upper flange wall 15b adjacent the outer free end 15e of the beam. The opposite or pivotally mounted end of the hanger bar 16 is formed with a depending, generally vertically disposed leg or strut 16b which, in this instance, has formed integrally therewith at the lower end thereof, a mounting base 16c in position spaced a distance below the body of hanger bar 16. This mounting base 16c is disposed generally horizontally and transversely relative to hanger bar 16 and extends a distance rearwardly of the hanger bar when facing the machine, as shown particularly by Figs. 4 and 14. The beam 15 may be formed, as in the example hereof, of decreasing depth or vertical width outwardly from the inner, pivotally mounted base end to the outer free end 15e thereof, in order to maintain the weight of the outer length of the hanger bar as low as possible while providing the requisite strength. The inner end of the beam 15 is secured in position on the hanger bar 16 by attaching the mounting base 15g of the beam on and against the inner vertically disposed face of that portion of the mounting base 16c of the hanger bar 16 which is disposed at the rear of the vertical plane of the hanger bar. Such attachment of base 15g of beam 15 to the base 16c of the hanger bar may be, as in the example hereof, through the medium of suitable machine screws or threaded bolt members 16d as shown in Fig. 4. Thus, the end of the hanger bar 16 to which the inner end of beam 15 is attached is forwardly offset relative to the beam and the hanger bar extends therefrom across the beam outwardly to the outer free end of the beam with its longitudinal axis inclined rearwardly relative to the longitudinal axis of the beam. While in this instance, the hanger bar 16 and the beam 15 are formed of separate elements, if desired, or found expedient, such members may be formed integral by providing the beam and hanger bar as a single casting.

The pivotal mounting of the beam structure

The beam structure B of the movement transmitting mechanism of this example, is mounted in position with the beam 15 of such structure generally horizontally disposed longitudinally of the machine, over and across the work table W and copy table P with the beam structure mounted at one end thereof at the left hand side of the machine for bodily swinging about a horizontal axis $a$—$b$ (see Fig. 4) in a vertical plane to move the beam 15 toward and from the tables W and P in the so-called third or "depth" dimension, and for bodily swinging horizontally about a vertical axis $c$—$d$ (see Fig. 2) which is perpendicular to and intersected by an extension of the horizontal axis $a$—$b$, to swing beam 15 in a horizontal plane over and across tables W and P in one of the lateral dimensions. One possible design and structural arrangement for pivotally mounting the beam structure B in operative position on the machine organization for swinging about the horizontal axis a—b and the vertical axis c—d, respectively, is illustrated in the machine of the instant example, as including an L-shaped link member 17 which has one arm thereof pivotally mounted for rocking on the horizontal axis a—b and the other arm thereof mounting and supporting the beam structure B and providing thereon the vertical axis c—d about which beam member B is bodily horizontally swingable independently of the link member in any position in which the link member 17 may be rocked with the beam structure B as a unit therewith about the horizontal axis a—b. In this instance, the link member 17 with the beam structure B mounted and supported thereon for rocking therewith and thereby, is pivotally mounted and supported on a bracket structure 18 which is bolted or otherwise suitably attached in position at the left hand side of the column structure 10 of the machine to the rear of the work table W. This bracket structure 18 includes the spaced, parallel bolsters or bearing mounting plates 18a which extend upwardly above the horizontal plane of the upper end of column structure 10 and which receive and mount the annular anti-friction bearings 18b therein having their axes horizontally aligned with each other and with and defining the horizontal axis a—b about which link member 17 is mounted for vertical rocking (see Fig. 3).

The bolster or bearing mounting plate 18a at the rear side of bracket 18 is provided with a rearward extension 18c (see Figs. 3 and 4) which provides a supporting structure for portions of the cutter spindle drive, as will be referred to more fully hereinafter.

The link member 17 may be formed as a hollow, box-like casting (see Fig. 4) of general L-shape to provide the vertical disposed leg 17a and the horizontally disposed arm 17b. The link member 17 is positioned in operative association in the machine organization with the lower end of leg 17a thereof disposed between the bearing bolsters 18a of bracket 18, and with the arm 17b extending horizontally forwardly from the upper end of the vertically disposed legs 17a, over and a distance across work table W, as will be clear by reference to Figs. 1, 3 and 4. The link member 17 is bodily vertically rockably mounted in such position supported from the bracket structure 17 by a pivot pin or shaft 19 which is secured therein and thereto with its opposite ends (forward and rear) extended beyond the forward and rear sides of leg 17a and being rotatably mounted and received in the anti-friction bearings 18b in the forward and rear bolsters 18, respectively. Thus mounted, link member 17 is supported from column structure 10 through the medium of the bracket structure 18 and the pin or shaft 19 journalled at its opposite ends in the bearings 18b respectively, so that the link member may be swung or rocked vertically about the axis a—b provided by shaft 19 to swing the horizontally disposed forwardly extended arm 17b thereof toward and from work table W.

The beam structure B is supported and hung from the forward end of the horizontal arm 17b of link member 17 for horizontal swinging independently of link member 17 about the vertical axis c—d which is perpendicular to but which intersects or lies in the vertical plane of, the horizontal axis a—b about which link member 17 and beam structure B are swingable as a unit. The pivotal mounting of the beam structure B on the link member 17 is effected by pivotally supporting the hanger bar 16 on the forward end of the horizontally disposed arm 17b of the link member at a location on the hanger bar above beam 15 adjacent the inner end thereof at the point of attachment with the depending mounting base 16c of the hanger bar, so that the beam 15 of beam structure B is suspended in horizontally disposed position extending over and across work table W below the hanger bar 16 and the pivotal mounting of the latter on the link member 17. In this instance, the forward end of the arm 17b of link member 17 is provided with horizontally disposed, vertically spaced arms or lugs 17c which mount therein the annular anti-friction bearings 17d respectively, which are horizontally disposed with their axes vertically aligned and concentric with the vertical axis c—d about which beam structure B is mounted on link member 17 for horizontal swinging. The hanger bar 16 mounts a vertically disposed pivot pin or shaft 16e extending therethrough in position above the inner end of beam 15, with the opposite ends of the pivot pin extending above and below hanger bar 16 and being received and rotatably journalled in the upper and lower anti-friction bearings 17d, respectively, carried by the vertically spaced arms or lugs 17c of link member 17. The pivot pin or shaft 16e provides and defines the vertical axis c—d about which beam structure B is horizontally swingable to move beam 15 in a horizontal plane laterally in either direction over and across work table W and pattern table P.

In order to reduce inertia of the vertically and horizontally swingable beam structure B and thus increase the sensitivity of the machine in operation, I prefer to construct the beam 15 and its hanger bar 16 of aluminum or other light weight material, while to increase rigidity and to absorb vibration, I prefer to construct the L-shaped link member 17 which pivotally mounts and supports the beam structure B, of cast iron or other material having similar characteristics. However, the use of such specific materials or of materials having similar characteristics, is not critical or essential to the operation or functioning of a machine of my invention.

Counterbalancing the weight of the beam structure

With the fixed horizontal axis a—b and the vertical axis c—d thus disposed in the same vertical plane at the left hand side of the work table W when facing the machine, the major portion of the beam structure B, including the hanger bar 16 with the beam 15 hung and suspended therefrom, is disposed with the weight thereof at one side (the right hand side) of the horizontal axis a—b about which such structure is vertically rockable as a unit toward and from the tables W and P. In order to counterbalance the weight of that portion of the beam structure B which is positioned over the tables W and P at the right hand side of axis a—b, together with the added weight of the tracer head T and cutter head C and associated structure mounted on beam 15, as will be hereinafter described, my invention provides an adjustable spring arrangement for applying forces of a desired magnitude to the beam structure B acting about the axis a—b in a direction to compensate for and counterbalance such weight.

Referring now to Figs. 2, 3, 4 and 5, I have shown a form of such a counterbalancing arrangement which embodies a tension spring unit 20 connected between the column structure 10 and the lower end of leg 17a of link member 17 at a point at the opposite side of horizontal axis $a$—$b$ (left hand side when facing the machine) from the side of this axis at which the weight of the major portion of the beam structure is located (the right hand side). As shown particularly in Fig. 5, this tension spring unit 20 embodies a relatively heavy coil tension spring 21 within a tubular casing or housing 21$a$ with the spring being secured at its lower end to a clevis 21$e$ attached to the column structure 10 on the left hand side thereof, a distance below the bracket structure 18 and link member 17. A rod or plunger 22 is slidably mounted in the upper end of casing 21$a$ and is formed with an eye 22$a$ at the inner end thereof within the casing to which the upper end of spring 21 is attached. This rod or plunger 22 extends outwardly through an axial bore in the upper end of casing 21$a$ to and upwardly through a slot in the outer end portion of an arm or lug 23 which is attached to the lower end of leg 17$a$ of link member 17 spaced to the left of axis $a$—$b$ and the pivot pin or shaft 19. Arm or lug 23 extends outwardly from leg 17$a$ with the rod 22 extending slidably through the outer end portion thereof spaced a distance radially from the pivot pin 19. The upper end of plunger 22 is suitably externally screw threaded and receives a nut 23$a$ for engaging the upper side of the lug 23 under the tension forces applied by spring 21 to rod 22 and continuously acting thereon to draw the rod downwardly. The spring unit 20 is mounted between clevis 21$e$ on column 10 and the lug 23 on the leg 17$a$ of link member 17, with the spring under tension and constantly exerting downwardly acting forces on the lug 23 to thus continuously develop turning moments acting about axis $a$—$b$ in a direction to swing or rock link member 17 against the opposing turning moments applied to the link by the weight of that portion of the beam structure B which extends over tables W and P at the opposite or right hand side of the axis $a$—$b$ of pivot pin 19.

Preferably the tension spring 21 of counterbalancing unit 20 develops a force of a magnitude acting about axis $a$—$b$ sufficient to overbalance the weight of the beam structure B and its associated mechanism so as to continuously act to swing the beam structure vertically upwardly away from tables W and P. I provide for adjustably counteracting the action of the tension spring 21 in order that the beam structure B may be counterbalanced to the degree desired from a maximum adjustment at which beam structure B is continuously urged to swing upwardly to an adjustment at which the weight of such structure acts to continuously overcome the force applied by spring 21 so that the beam structure is continuously urged to swing downwardly. Various adjustments may be effected between these maxima, including an adjustment by which the force of the spring 21 is approximately exactly counterbalanced by the weight of the beam structure so that until raising or lowering forces are externally applied to the beam structure, such structure will remain in a condition of balance with beam 15 positioned in substantially horizontally disposed position over tables W and P.

In the present example, I have provided for adjustably counteracting the forces applied by the tension spring 21 to the link member 17 through the medium of a relatively light compression spring 24 which can be adjusted to exert forces of a required magnitude acting on link member 17 in a direction opposing the forces exerted thereon by spring 21. Referring to Fig. 5 in particular, the bracket structure 18 is provided with a flange 25$a$ formed integral therewith and positioned extending upwardly and outwardly from the inner side of the bracket base to a position at but having operating clearance with the underside of the central portion of the lower end of leg 17$a$ of link member 17. The leg 17$a$ of link member 17 is provided at the inner side thereof opposite pivot pin 19, with an inwardly and downwardly extending flange 25$b$ formed, in this instance, integral therewith and extending thereacross in position over but generally parallel with the flange 25$a$ of bracket structure 18 (see Fig. 4). A bolt member 25 is threaded at its lower end into bracket flange 25$a$ and extends upwardly therefrom through an open outer end transverse slot 25$c$ in flange 25$b$, such slot being generally radially disposed relative to pivot pin 19 and the horizontal axis $a$—$b$. At its outer upper end the bolt member 25 is provided with a knurled head 25$d$ by which the bolt may be rotated in either direction to move the head 25$d$ toward or from flange 25$b$ to thus decrease or increase the space between the upper surface of the flange and the under surface of head 25$d$. A relatively light expansion spring 24 of coil type is mounted on bolt 25 between the upper surface of flange 25$b$ and the under surface of the head 25$d$. If desired a suitable cup-like container 24$a$ may be provided on flange 25$b$ for receiving the inner end length of spring 24.

The compression spring 24 is so mounted that when link member 17 is rocked on pivot pin 19 to raise beam structure B away from tables W and P, the flange 25$b$ is swung upwardly relative to bolt member 25 to compress spring 24 so that the spring exerts forces acting on link member 17 to oppose and resist upward swinging of beam structure B to thus counteract the forces applied to the link member by the tension spring unit 20. The forces exerted on link member 17 by the compression spring 24 can be adjusted to a desired magnitude for any required condition of counterbalancing, by adjusting the bolt member 25 to increase or decrease the degree of compression of spring 24. By the arrangement of tension spring 21 and compression spring 24, it is possible to quickly manually adjust the compression force of the relatively light spring 24, so that, with a very minor adjustment thereof the beam structure B can be biased to tend to swing either upwardly away from or downwardly toward tables W and P, or the forces of springs 21 and 24 can be adjusted relative to the weight of the beam structure so as to substantially balance such structure.

*Releasably locking the beam structure against vertical swinging*

In accordance with another feature of the invention, provision is made for releasably locking link member 17 and the beam structure B against bodily vertical swinging about the horizontal axis $a$—$b$ toward and from work tables W and P. Such locking of the beam structure B which carries the tracer head T and cutter head C is effected when it is desired to perform two dimensional engraving or reproducing operations with the machine. When the machine is to be operated for three dimensional work, such locking means is released in order to permit vertical swinging of the beam structure B to move the tracer head T and cutter head C vertically to reproduce in the so-called third or "depth" dimension.

In the instant expression of such a releasable locking means for the machine of this example, referring now to Figs. 1, 3 and 4, a threaded bolt 26 extends downwardly through and is freely received in a transverse open outer edge slot 26b in flange 25b on the leg 17a of link member 17, with the lower inner end of the bolt member externally threaded and screwed into a suitable tapped bore in flange 25a on the bracket structure 18. The bolt member 26 may have threaded on to the externally threaded portion of the bolt member beneath flange 25b, a lock nut member (not shown). A nut 26a (see Figs. 1 and 4) is threaded on to the bolt member 26 between the outer headed end thereof and the upper side of flange 25b. By screwing the nuts on bolt member 26 to position clamping flange 25b therebetween, the link member 17 can be locked against rocking about pivot pin 19 to thus maintain beam structure B in a desired position over tables W and P against vertical swinging relative thereto. By screwing the nuts on bolt 26 to positions thereon spaced above and below flange 25b, such flange is released to permit free rocking of link member 17 on pivot pin 19 so that the beam structure B may then be vertically swung toward and from tables W and P in order to carry out three dimensional engraving or reproducing operations.

*The anti-friction slides for the tracer head and cutter head*

The beam structure B constructed and pivotally mounted as hereinbefore described, mounts on the beam 15 thereof the tracer head TH for the tracer T and the cutter head CH for the rotary cutter C, with the tracer and cutter heads relatively movable to move tracer T and cutter C in scaled relation over the pattern table P and work table W, respectively, in one lateral dimension by bodily horizontal swinging of the beam structure B about the vertical axis c—d provided by the pivot pin 16a of hanger bar 16 on link member 17, and movable in scaled relation in the so-called third or "depth" dimension by bodily vertical swinging of beam structure B with the link member 17 as a unit about the horizontal axis a—b provided by the pivot pin 19. The tracer head TH with tracer T and cutter head CH with cutter C are, in accordance with the principles of my invention, movable in scaled relation in the other lateral dimension by mounting such heads on the beam 15 of beam structure B for reciprocation in either direction along a straight line path parallel with the longitudinal axis of beam 15, through the medium of an adjustable pantograph linkage L which operatively associates the tracer and cutter heads to cause such heads to move in accurately scaled relation relative to each other on beam 15 at any reduction or enlargement ratio for which the pantograph linkage L may have been adjusted. In the present instance, the tracer head TH is mounted on a carriage or slide TS while the cutter head CH is mounted on a separate, independent similar carriage or slide CS with these slides TS and CS being reciprocally mounted and received in a straight line slideway or track provided therefor on and along the forward side of the beam, so that such carriages or slides may be reciprocated on the beam track relative to each other and independently of the beam in either direction along a straight line path parallel with the longitudinal axis of the beam.

Such a slideway or track, referring now to Figs. 1, 6, 9 to 13 inclusive and 15, may as in the example hereof, include an upper rail 30 and a lower rail 31. The upper and lower rails 30 and 31 extend throughout the length of the beam 15 to provide an uninterrupted slideway or track from end to end of the beam. The upper rail 30 is mounted and attached in position under and along the forwardly extending, horizontal flange 15d at the upper side of beam 15, by a series of headed screws 33 (referring to Fig. 6 in particular) which extend forwardly through the vertical base wall 15c of beam 15 at spaced intervals along the length of the beam. These screws 33 are received in oversized bores 33a in the base wall 15c, so as to have limited movements radially in such bores. Each of the screws 33 is externally threaded at the forward side thereof and is received in a tapped bore through the rail 30. The head 33b of each screw 33 preferably engages and seats against a washer 33c between the head and the adjacent inner surface of wall 15c. Upper rail 30 is secured in position against the forward vertical surface of beam base wall 15c by rotating the screws 33 into tightly seated position against washers 33c to thus draw rail 30 inwardly into seated position against the forward surface of wall 15c. A series of vertically disposed set screws 34 are located at spaced intervals along the length of the upper flange 15d of beam 15 for engaging the upper edge of rail 30 to in effect provide for vertical adjustment downwardly of rail 30 relative to the lower rail 31 within the limits permitted by the vertical play possible to the screws 33 in the oversized bores 33a. The set screws 34 are threaded downwardly through tapped bores in flange 15d with their lower ends engaged with and abutting against the upper side of rail 30, and each is provided at the upper end thereof with a suitable head 34a by which the same may be rotated. The upper rail 30 is provided with a V-groove 30a centrally of the underside of the rail and extending longitudinally from end to end thereof.

The lower rail 31 is formed of a strip or bar of greater width than the upper rail 30 and is secured in horizontally disposed position in a recess 15r extending longitudinally in the underside of the vertical base wall 15c and lower flange wall 15b, by means of a series of machine or cap screws 35 located at spaced intervals along the longitudinal length of the rail. Rail 31 extends forwardly a distance beyond the front or forward face of wall 15c and is positioned in parallel relation with the upper rail 30. The upper side of rail 31 at the forward side of wall 15c is provided with a central V-groove 31a therein extending longitudinally from end to end thereof, such V-groove 31a of rail 31 being in substantial vertical alignment with the V-groove 30a of the upper rail 30.

A horizontally disposed slideway or track is thus provided extending longitudinally from end to end of beam 15 at the forward side thereof for receiving the carriages or slides TS and CS on and between the upper and lower rails 30 and 31 for reciprocation of such slides relative to each other in a straight line path in either direction longitudinally of and along beam 15.

By a feature of my invention, each of the slides TS and CS is of an anti-friction type in which endless series of anti-friction balls are provided along the upper and lower edges of a slide to form slide supporting bearing members for rolling, minimum friction engagement in and along the V-grooves 30a and 31a, respectively, of the rails forming the horizontal track along the forward side of beam 15. In this instance, each of these slides TS and CS is basically similar and a detailed description of one will suffice as a description for both slides. Referring to Figs. 10 to 13 inclusive, in connection with Fig. 6 showing the slide CS for the cutter head CH and Fig. 9 showing the slide TS for the tracer head TH, each slide includes a body structure comprising a main, intermediate plate member 40 having secured thereto at opposite ends thereof the end plate members 41, respectively. The intermediate plate member 40 has a width slightly less than the vertical distance between the facing inner surfaces of the upper and lower track rails 30 and 31, while the opposite end plate members of the slide body have a width slightly greater than the spacing between the track rails so that the upper and lower edge portions thereof may project a distance inwardly into the V-grooves 30a and 31a respectively, when the slide is in mounted position on the track. The portions of the opposite upper and lower longitudinal edges 41a (see Fig. 10) of the end plates 41 which are adapted to project into the V-grooves 30a and 31a, may be formed of reduced width, preferably of V shape in cross section, to extend into the V grooves with operating clearance with the V-grooved surfaces. The overall thickness of the slide body forming plate members 40 and 41 is in this instance slightly less than the horizontal width of the rail members 30 and 31 measured from the forward face of base wall 15c of beam 15 to the outer faces of the rails, in order that operating clearance will be provided between the inner side of a slide and the adjacent outer side of beam wall 15c between the upper and lower rails 30 and 31, with the slide in mounted position having its outer side located approximately in the vertical plane of the outer side surface of the rails.

The opposite longitudinal edges (upper and lower edges) of the intermediate plate member 40 of a slide body are each provided with a centrally located longitudinally disposed V groove 40a (see Figs. 6 and 9) therein, with each of these grooves open and unobstructed at the opposite ends thereof. Cylindrical bores 42 forming anti-friction ball receiving passages are formed extending longitudinally and completely through the plate member 40 of the slide body parallel with the opposite longitudinal edge V grooves 40a, such bores 42 being located extending through the central portion of the plate member centered transversely relative thereto in parallelism, with each bore being spaced a distance inwardly from the groove 40a in the adjacent longitudinal edge of the plate member.

Each end plate member 41 of a slide body is formed with an upper semi-circular curved, ball direction reversing passage 43 formed therein on a radius of curvature such that the lower or inner end thereof opens through the inner, vertical edge of the end plate in axial alignment with the adjacent end of the upper of the ball passages 42, while the upper or outer end of passage 43 is axially aligned with and opens into the ball receiving V groove 40a at the upper edge of the plate member 40 of the slide body. A similar semi-circular, ball direction reversing passage 44 is formed in each end plate 41 spaced below the passage 43 of the plate. The semi-circular passage 44 of each end plate 41 is formed on a radius of curvature and is so located relative to lower passage 43, that the upper or inner end thereof is in axial alignment with the adjacent end of the lower ball return passage 42 while the lower or outer end thereof is in axial alignment with and opens into the V groove 40a in the lower or under longitudinal edge of plate member 40 of the slide body. Thus, there is formed an endless passage or path in the body of each slide at the upper portion thereof consisting of the upper passage 42, the V groove 40a in the upper edge of plate member 40, and the opposite end curved connecting passages 43, respectively, in end plates 41; and a similar endless passage or path is formed in the lower portion of the slide body by the lower passage 42, the V groove 40a in the lower edge of plate member 40, and the opposite end curved passages 44 which place passage 42 and V groove 40a in communication at opposite ends thereof, respectively.

The upper endless passage of which V groove 40a in the upper edge of plate member 40 forms a part is completely filled with an endless series of anti-friction balls 45 which are freely revolvably mounted and confined therein, so that the V groove 40a at the upper edge of plate member 40 of a carriage or slide body is completely occupied at all times by a straight line of the balls 45. The balls 45 are all of the same diameter, which diameter is such that those of the balls which are located in and occupy the V groove 40a at the upper edge of plate member 40 project upwardly beyond the upper edge of plate member 40, preferably so that at least the upper halves of the balls are exposed and are unobstructed above plate member 40. Anti-friction balls 46 all of the same diameter, are similarly freely revolvably mounted and confined in and completely occupy the endless passage of which V groove 40a in the lower or under edge of plate member 40 forms a part, so that such V groove 40a at the underside of plate 40 is completely occupied at all times by a straight line of the balls 46. The balls 46 are of such a diameter that those thereof located at any time in and occupying the V groove 40a at the lower edge of plate member 40, project beyond such lower edge and are exposed and unobstructed preferably at least, over the lower halves thereof.

A slide so constructed and arranged is mounted in vertically disposed position between the upper and lower rails 30 and 31 at the forward side of beam 15, with the straight line of the balls 45 which are located in the V groove 40a in the upper edge of plate member 40 being received in and having rolling engagement with the opposite side inclined surfaces of the V groove 30a in the underside of upper rail 30, and with the straight line of the balls 46 which are in the V groove 40a in the lower edge of plate member 40 being received in and having rolling engagement with the opposite inclined side surfaces of the V groove 31a in the lower rail 31. With the slide so mounted and positioned, the upper and lower edges 41a of the opposite end plates 41 extend down into the grooves 30a and 31a respectively, of the upper and lower rails, with operating clearance and without engagement thereof with the opposite side inclined surfaces of these V grooves of the rails. Thus, a slide is mounted and supported on and between the upper and lower rails 30 and 31 by the straight lines of the balls 45 and 46 which occupy and fill the V grooves 40a at the upper and lower edges, respectively, of the body plate member 41, such upper and lower lines of balls providing anti-friction supporting bearings for and on which the slide is freely reciprocal. A slide may be reciprocated in a straight line in either direction longitudinally of beam 15 on the endless series of anti-friction balls 45 and 46 engaged in the V grooves in the upper and lower rails 30 and 31, with the balls of each series during reciprocation being freely fed from a V groove 40a to the return passage 42 therefor through one or the other of the opposite end curved passages 43 or 44, and being returned back to such V groove by the curved passage 43 or 44 at the opposite end, depending upon the direction of reciprocation of the carriage or slide. A slide while being freely reciprocal on the rails 30 and 31 in either direction longitudinally of beam 15, is held against lateral displacement from mounted position on the rails by the balls 45 engaged in and between the V grooves in the rails and the V grooves in the upper and lower edges of the plate member 40 of the slide body.

*Lubrication of the carriage or slide track and the anti-friction ball bearings*

In accordance with a further feature of the invention, I have provided for automatic lubrication of the V grooves 30a and 31a of the upper and lower rails 30 and 31, respectively, and of the endless series of balls 45 and 46 and their respective endless passages, as well as for the protection of the balls and their confining passages, against access of dirt, dust, metal particles or other foreign matter thereto. In the present example, referring now to Figs. 10 to 13, this feature is expressed by providing adjacent each end of each end plate 41 of a slide body, a pair of vertically disposed opposite, upper and lower, graphite or similar lubricant impregnated material wipers 50 positioned in longitudinal alignment disposed transversely of the end plate in transversely aligned slots formed through the opposite upper and lower portions of the plate. Preferably, although not essentially, the slots for receiving the wipers 50 extend completely through the width of an end plate 41 and terminate at their inner ends spaced apart to provide an intermediate portion 51 of the end plate therebetween. In this instance, each wiper 50 is of substantially the full width of the end plate and the wiper receiving slot therein and has a sliding or running fit in such slot. Each wiper extends outwardly beyond the outer edge of the end plate and is pointed or V-shaped so as to fit into the adjacent V groove of a rail 30 or 31 in sliding lubricant applying engagement with the opposite inclined walls of such track groove.

The opposite upper and lower wipers 50 of each pair of wipers at the opposite ends of an end plate 41, are continuously spring biased outwardly into lubricating engagement with the surfaces of the V grooves 30a and 31a of the upper and lower tracks 30 and 31. In the illustrated example, such spring biasing of wipers 50 of each pair of wipers, is effected by providing a bore transversely through the portion 51 of plate 41 which is located between each pair of aligned wiper receiving slots with such bore aligned with the opposite slots. A coiled expansion spring 52 is mounted and confined under compression in such bore with its opposite upper and lower ends engaged with the inner ends of the upper and lower wipers 50, respectively, of the pair of wipers.

In operation, as a slide is reciprocated on the track formed by the rails 30 and 31, the lubricating wipers 50 on the outer end of the opposite end plates 41, respectively, are maintained in constant sliding engagement with the V grooves 30a and 31a of the rails, by the forces exerted thereon by the biasing springs 52, so that the wipers constantly apply lubricant to the rail grooves as the wipers are moved through the grooves in engagement with the surfaces thereof. The lubricant thus applied to the rail grooves 30a and 31a is picked up by the endless series of balls 45 and 46, with the result that these balls are also lubricated and will in turn lubricate the endless passages provided therefor and through which such balls roll in engagement with the surfaces thereof. Under the action of the biasing springs 52, as the outer end portions of the wipers 50 in the rail grooves are worn away, the wipers will be continuously urged into and maintained in wiping, lubricating engagement with the opposite inclined surfaces of the V grooves. Thus, the lubricating contact ends of the wipers will be worn to shape to always conform to the exact shape of the surfaces of the V grooves with which they are respectively in contact. The lubricating contact ends of the wipers 50 thus also serve to form and maintain substantial sealing engagement with the V groove surfaces.

These lubricating wipers 50 mounted on the opposite end slides 41 close the opposite ends of the slide body at the upper and lower rail grooves 30a and 31a by substantial sealing engagement with the groove surfaces, hence, these wipers in addition to automatically lubricating the rail groove surfaces and the endless balls 45 and 46, further function as guards or seals to prevent the entry of dirt, metal particles or other foreign matter into the spaces between the opposite end wipers through which the series of endless balls 45 and 46, respectively, are rolled. In addition, the wiping action of the lubricant wipers 50, sweeps and clears away any foreign matter which may have collected in the V grooves 30a and 31a in the path of reciprocation of a slide along the track rails 30 and 31.

*The slide mounted tracer and cutter heads*

The slide TS for the tracer head TH and the slide CS for the cutter head CH are substantially identical in the machine of the illustrated example, and each embodies the construction and arrangement and the operative mounting thereof on the track-forming rails 30 and 31 at the forward side of beam 15, as hereinbefore described and explained. In this instance, the outer-most slide on the beam 15 is the slide TS which mounts and carries the tracer head TH, while the slide CS which mounts and carries the cutter head CH is mounted on beam 15 between slide TS and the inner end of the beam. For normal reduced scale engraving or reproduction the tracer unit T is mounted in the tracer head TH on the outer-most slide TS and the cutter unit C is mounted in the cutter head CH on the innermost slide CS. But as will be hereinafter explained the tracer unit T and the cutter unit C are interchangeable in the heads TH and CH, and for enlarged scale engraving or reproduction the tracer T is mounted in the cutter head CH and the cutter unit C is mounted in the tracer head TH.

The slide TS, referring now to Figs. 8 and 9 in connection with Figs. 1, 2, 14 and 15, includes a base plate 55 for mounting the tracer head TH. This base plate 55 is mounted and secured in vertically disposed position over and against the outer side of the slide TS, being secured in position thereon by means of suitable screws 55a extending through the end plates 41 of the slide into the base plate 55 at the inner side thereof, suitable dowel pins 55b for accurately positioning plate 55 on the slide being also provided. The securing screws 55a and the dowel pins 55b are generally indicated in Fig. 10. A positioning rib 55c may be provided disposed longitudinally and extending outwardly from the forward side of plate member 40 of the slide body (see Fig. 9), with such rib received in a complementary recess formed in the inner side of base plate 55. At its inner end the base plate 55 is provided with a vertical post 56 extending upwardly therefrom to terminate at its upper end in a horizontal plane spaced above the horizontal plane of the upper side of beam 15. Post 56 is provided for pivotally connecting to the upper end thereof one end of a link of the pantograph linkage L thereto for operatively coupling slide TS with linkage L, as will be hereinafter described.

The mounting base 55 is provided with a vertical, substantially semi-circular concave recess 57 which extends completely throughout the full depth or vertical width of base 55, being open at its opposite ends through the upper and lower edges of such base member. This vertical recess provides a seating and clamping surface for receiving and into which either the tracer unit T or the cutter unit C is clamped and secured in vertically disposed, mounted position on the base 55. The vertical tracer unit (or cutter unit) receiving recess 57 is spaced outwardly a distance along the mounting base 55 from the vertical post 56 at the inner end of the base and the tracer head TH is pivotally mounted on the base for horizontal swinging on a vertical hinge or pintle pin 58 located on base 55 in position intermediate the inner end of the base and recess 57, by means of vertically spaced horizontal hinge arms 58a extending inwardly from head TH to and pivotally mounted on the pin 58. The tracer head TH in this instance, is of semi-circular form to provide a vertically disposed semi-circular tracer or cutter unit engaging and clamping surface 58b at the inner side thereof. The head TH when in closed, tracer or cutter unit clamping and mounting position is swung inwardly on pin 58 and hinge arms 58a to positions substantially against the adjacent outer side of base 55, as will be clear by reference to Fig. 8. In such closed position of head TH, the vertical semi-circular clamping surface 58b thereof forms with the opposite semi-circular surface of recess 57, a substantially circular vertical opening or bore open at its upper and lower ends, for receiving and into which a tracer unit T or a cutter unit C may be clamped in mounted position on the slide TS.

The head TH at the outer side thereof is provided with a horizontally disposed outwardly extended and horizontally slotted lug or flange 58c which is adapted to receive in the slot thereof a locking member 59 which is pivotally mounted on base 55 on a vertical pivot pin 59a and which extends horizontally outwardly from the base. Locking member 59 is provided with a spring loaded head 59b at the outer end thereof which is constantly biased inwardly of the member. Head TH is releasably secured in closed, clamping position by swinging locking member 59 inwardly into the slot over the flange or lug 58c of the head with the spring biased head 59b released into engagement with the outer side of lug 58c to maintain locking member 59 against inadvertent displacement. In order to release head TH for opening, head 59b is drawn outwardly from engagement with lug 58c, and the locking member 59 is then swung horizontally outwardly to position clearing the lug, after which the tracer head TH may be swung horizontally outwardly and inwardly of the slide to open the head for removal therefrom or for mounting therein, a tracer unit T or a cutter unit C.

The tracer head TH is provided with a spring loaded positioning pin 59c, referring now to Figs. 8 and 9, which is reciprocally mounted in a horizontally disposed tubular casing 59d extending outwardly from the forward side of the head. This positioning pin 59c is formed at its inner end with a tooth 59e which projects inwardly into the tracer unit receiving recess in the head and which is adapted to be engaged into a notch or recess formed in the side wall of the barrel or body of a tracer unit T or a cutter unit C when in mounted position in the head to maintain such unit against movement relative to the head. Pin 59c may be drawn outwardly against its spring loading to disengage pin 59e from a unit C or T clamped or mounted in the head.

The slide CS which mounts the cutter head CH, referring now to Figs. 6 and 7 in connection with Figs. 1, 2, 14 and 15, includes a base plate 55' generally similar to base plate 55 of slide TS. Plate 55' is mounted and secured in vertically disposed position over and against the outer side of the slide CS in the same general manner hereinbefore described with reference to base plate 55 of slide TS.

At its inner end, the base plate 55' is provided with a vertical post 60 extending upwardly therefrom and having a vertical pivot pin 61 mounted in the upper end thereof on which a horizontally disposed slider or clamp block E of the pantograph linkage L is mounted for rotation about the vertical axis e (see Figs. 16, 17 and 18) of pivot pin 61 in a horizontal plane positioned above the plane of the upper side of the beam 15.

Mounting base 55' is provided with a vertical, substantially semi-circular concave recess 57' (see Figs. 6 and 7) similar to recess 57 described in connection with base plate 55 of slide TS, which extends completely throughout the full depth or vertical width of the base 55' in order to provide a seating and clamping surface for receiving and engaging either the cutter unit C or the tracer unit T. The cutter head CH is similar to cutter head TH and is horizontally swingably mounted on the mounting base 55' by hinged arms 58a and vertical hinge pin 58, in the same manner as hereinbefore described in connection with the tracer head TH and its mounting on base 55. This cutter head CH is provided with a locking pin 59 and with a positioning pin 59c similar to such members as described in connection with the tracer head TH by which the cutter head may be releasably locked in closed cutter unit or tracer unit receiving and clamping position.

At the inner end of mounting base 55' of slide CS, a bracket structure is provided which includes a vertical column 62 secured at its lower end on the mounting base and extending upwardly therefrom over and spaced a distance above the cutter head CH and the cutter unit receiving space or bore formed by the cutter head in closed position thereof. Referring now to Fig. 6, an externally threaded pin 63 for adjusting and setting the vertical position of the cutter spindle of cutter unit C, is threaded into a tapped vertical bore in the arm 62a with this adjusting pin approximately axially aligned with the axis of the cutter unit receiving and mounting bore provided by the cutter head CH when the latter is in closed position on slide CS. This adjusting pin 63 depends downwardly a distance below the underside of arm 62a and terminates in a concave cup or stop member 63a which is open at its lower side for receiving and engaging a vertical position controlling pin projecting upwardly from the upper end of cutter unit C. Adjusting pin 63 may be provided with a knurled disc 63b thereon for manually rotating the adjusting pin in its tapped bore in arm 62a to raise or lower the cup or stop 63a so as to adjust the vertical position thereof. A suitable set screw 63c is threaded through a horizontally disposed, tapped bore in the end of arm 62a, which bore has its axis perpendicular to the vertical axis of pin 63, for engaging at its inner end the pin 63 to releasably lock pin 63 against rotation in any position of adjustment of the latter pin.

Attention is here directed to the fact that the bracket structure formed by the column 62 and the vertical adjustment pin carrying arm 62a, is preferably mounted for removal as a unit so that a suitable curved or other contoured surface forming guide (not shown) may be mounted on beam structure B for operative engagement by the pin 64a at the upper end of cutter unit C which controls the vertical positioning of the cutter spindle 64. Such a forming guide, as will be familiar to those skilled in the art, is utilized for engraving or reproducing on a curved or other contoured surface from a flat master or pattern, and may, for example, be of the type generally exemplified by such forming guides as shown in U. S. Patents Nos. 1,956,505 to George Horner, and 1,959,269 to George Gorton. Obviously other arrangements may be utilized for mounting a forming guide for cooperative functioning with the pin 64a, with or without the necessity of removing the bracket comprised by the column 62 and the adjusting pin carrying arm 62a.

*The interchangeable tracer unit and cutter unit*

A feature of my invention embodied in the machine of the present example, resides in a design and arrangement by which the tracer unit T and the cutter unit C are readily interchangeable in the tracer head TH and the cutter head CH, so as to render the machine capable of either reduced scale or enlarged scale engraving or reproducing operations without requiring accessory or adaptor mechanisms.

In carrying out this feature, I have provided the tracer head TH and the cutter head CH of a design and construction such that the vertical receiving and mounted bore provided by each of these heads is of the same internal diameter. The cutter unit C referring to Fig. 6, may be of any usual construction to include a rotary cutter spindle 64 rotatably mounted in a barrel or casing 65 having an external diameter substantially equal to the internal diameter of the receiving or mounting bores of the cutterhead CH and the tracer head TH, although it is preferable that the external diameter of barrel 65 be slightly oversize relative to the internal diameter of the head bore. The cutter spindle 64 which is rotatably mounted in barrel 65, is preferably of the spring loaded, floating type and is constantly biased upwardly through a limited range of vertical movements axially of barrel 65. At the upper end of barrel 65 there is provided a suitable pin 64a on the spindle mounting assembly in barrel 65, which may serve to engage a stop member such as the cup 63a of the vertical adjustment pin 63. The cutter spindle 64 at the lower end thereof below barrel 65 of the cutter unit C, is provided with a stepped driving pulley 66 by which cutter spindle 64 is rotated, while the lower end of the spindle 64 is provided with the usual collet or chuck for removably mounting therein an engraving or other reproducing tool A. The construction, arrangement and general functioning of a cutter unit C as above outlined, are well-known and understood in this art, being broadly typified for example by the cutter head or unit such as disclosed in the U. S. patent to Henkes, No. 1,750,594, of March 11, 1930. Hence, it is not believed necessary to make herein a detailed disclosure of the construction of the cutter unit C.

The barrel 65 of the cutter unit C is of greater length longitudinally than the depth of the cutter unit receiving and mounting bore formed in the cutter head CH, and unit C is mounted and clamped in operative position in head CH on slide CS, by swinging the cutter head CH inwardly onto and against cutter unit C, and then clamping the head in such closed position by the locking pin 59 and by the positioning pin 59c as will be clear by reference to Figs. 6 and 7 of the drawings. With the external diameter of barrel 65 slightly oversize relative to the internal diameter of the bore formed by the cutter head CH in closed position thereof, the barrel 65 will be tightly and firmly clamped in mounted position, positioning pin 59c insuring against vertical displacement or rotation of unit C in and relative to the cutter head CH.

The tracer unit T which is normally mounted in the tracer head TH, embodies in this example, a tracer stem or body 67 provided at its lower end with a pattern engaging and scanning style S in axial continuation thereof but of reduced external diameter relative thereto. The stem or body 67 of the tracer unit T is mounted in and extends through a cylindrical bushing 68 having an axial bore therethrough which receives the tracer stem, with the stem being extended outwardly beyond the opposite ends, respectively, of the bushing. The bushing 68 has an external diameter at least equal but preferably slightly oversize relative to the internal diameter of the tracer unit receiving bore formed by the tracer head TH when in closed position on mounting base 55 of the slide TS. Thus, as the receiving and mounting bores formed by the tracer head TH and by the cutter head CH, respectively, each have the same internal diameter, and as the external diameters of the barrel 65 of cutter unit C and of the bushing 68 of tracer unit T are also equal, the tracer unit T and the cutter unit C may be interchangeably mounted in the cutter head CH and the tracer head TH for either reduced scale or enlarged scale engraving or reproducing operations.

A further feature of the invention in connection with the interchangeability of the cutter and tracer units C and T in the cutter and tracer heads CH and TH, resides in the arrangement by which the cutter spindle belt drive of the machine of this example may be utilized without reorganization or the necessity for special equipment or accessories, for driving the cutter spindle 64 from the driving pulley 66 thereof when the cutter unit C is mounted in either the cutter head CH or the tracer head TH.

In this example, a belt drive or transmission is provided for rotating the spindle 64 which is of the type of drive illustrated and described in the U. S. Patent No. 1,790,581 to George Gorton et al. to which reference may be had for detailed disclosures. Such a drive, referring now to Fig. 4 in connection with Figs. 1 and 2, includes a pivotally mounted, horizontally swingable arm 70 pivotally mounted at one end thereof on the extension 18c of the bracket structure 18, and which arm extends outwardly from extension 18c spaced to the rear of and generally parallel with beam structure B. This arm 70 at its outer end carries a stepped pulley 70a which is mounted on a vertical axis for rotation in a horizontal plane. Pulley 70a is driven by a suitable endless belt 70b mounted on one step thereof and which extends therefrom to and downwardly over idler pulleys 70c positioned at the rear end of arm 70. Belt 70b extends from such pulleys downwardly to a suitably pivotally mounted, counterbalanced motor (not shown) as will be readily understood by reference to the above referred to Patent No. 1,790,581. A spindle driving belt 71 is mounted on the other step of pulley 70a and extends forwardly therefrom to the desired step of the stepped spindle pulley 66. A radius or push-pull rod 72 connects the outer end of horizontally swinging arm 70 with the lower end of cutter unit C. This push-pull rod 72 is formed for adjustment of the length thereof to obtain the desired normally fixed spacing between pulley 70a and the cutter spindle driving pulley 66. Arm 70 is preferably of a length such as to position the pulley 70a spaced to the rear of beam structure B and located generally centrally of the longitudinal length of the beam structure. Hence, as beam structure B is swung laterally back and forth across the tables W and P in a horizontal plane about the vertical axis c—d, the arm 70 with pulleys 70a thereon is similarly swung and the required spacing between pulley 70a and cutter spindle pulley 66 for the belt 71 is maintained by the push-pull rod 72. As the arm 70 of the spindle belt drive and the beam structure B are maintained in fixed position relative to each other by the push-pull rod 72, and as the tracer head TH and the cutter head CH at all times are maintained in a straight line along and in a vertical plane parallel with the longitudinal axis of beam 15, it follows that the tracer head and the cutter head are maintained with their axes on radii of a circle generated about the axis of the pulley 70a as a center. Hence, the spindle driving belt 72 may be operatively mounted on spindle pulley 66 with the cutter unit C mounted in either the cutter head CH or in the tracer head TH. It is only necessary to remove the cutter unit C from mounted position in either head CH or head TH, mount it in the other of such heads, and then make whatever adjustment may be required in the length of the push-pull rod 72 to maintain the required spacing between pulley 70a and spindle pulley 66 to obtain the desired driving tension on belt 71 with the cutter unit C in its new position.

*The scaled movement transmitting linkage for the slide mounted tracer and cutter units*

The slide TS carrying the tracer head TH and the slide CS carrying the cutter head CH are mounted at the forward side of beam 15 for reciprocation along a straight line path in either direction along the longitudinal axis of the beam to move the tracer unit T and the cutter unit C respectively, in scaled relation relative to each other in one of the lateral dimensions over the work table W and the pattern table P. The tracer head TH and the cutter head CH mount the tracer unit T and the cutter unit C in position with their axes maintained at all times parallel and perpendicular to the planes of the tables W and P, as will be understood by those familiar with the operations of engraving or reproducing on a work piece a replica of a pattern or master. The tracer slide TS is mounted on beam 15 between the cutter slide CS and the outer free end 15e of the beam. As illustrated in this example, slide TS may be provided with a stop member 73 projecting upwardly from the upper edge thereof for engaging a stop block 74 secured on upper rail 30 adjacent the outer end of the rail in position to determine the limit of outward movement of slide TS on the beam, as well as to prevent outward displacement of the slide from the beam at the outer ends of rails 30 and 31.

In order to effect the desired movements of the style S of tracer unit T and of the cutter A of the cutter unit C in accurately scaled relation relative to each other longitudinally of beam 15, and to position style S and cutter A on beam 15 relative to the horizontal axis a—b and to the vertical axis c—d of beam structure B, so as to obtain the required movements thereof in scaled relation by the swinging of the beam structure about such axes, respectively, I have provided an arrangement of adjustable, movement transmitting linkage for operatively coupling the slides TS and CS. The arrangement of the linkage is such that straight line movements in either direction of either one of these slides TS and CS longitudinally of the beam 15 will be translated by the linkage as reduced or amplified movements of the other slide in accurately scaled relation in accordance with the precise ratio of reduction or amplification for which the movement transmitting linkage has been adjusted and set. And as a further and important feature of my invention, the arrangement and relative mounting and association of the movement transmitting linkage on and relative to the beam 15 and to the tracer and cutter units T and C mounted on the slides TS and CS, is such that the adjustment of the linkage for a desired ratio of scaled movements of the units T and C relative to each other in the one dimension longitudinally of beam 15, will automatically adjust and set such units for scaled movements relative to each other in the same ratio when moved with the beam structure B about the horizontal axis a—b and the vertical axis c—d in the other two dimensions, respectively.

One form of such a movement transmitting linkage is illustrated in Figs. 1 to 4, inclusive, and Figs. 16 to 18, inclusive, as the linkage L, while another form thereof which will be hereinafter described, is illustrated as the linkage L' in Figs. 14 and 19 to 21, inclusive.

The linkage L, referring now to Figs. 1 to 4, includes a long slider bar or link 80 slidably mounted in horizontally disposed position in the clamp block E which is pivotally mounted on pivot pin 61 at the upper end of column 60 on the slide CS. This long bar 80 is positioned extending angularly over and across the upper side of beam 15 with its inner or forward end positioned spaced from the forward side of the beam and its outer or rear end positioned spaced from the opposite rear side of the beam.

The outer or rear end of the long slider bar or link 80 is coupled with the outer slide TS on beam 15 by a link 81 which is pivotally connected at its rear end with the end of link 80 by a vertical pivot pin 82 providing a vertical pivot axis $f$ (see Fig. 16). Link 81 extends forwardly to and is pivotally coupled to slide TS at its forward end on a vertical pivot pin 83 having a vertical pivot axis $g$ (see Fig. 16) which is mounted in fixed position on the upper end of the vertical post 56 at the inner end of the slide TS. The inner or forward end of the long slider bar 80 is coupled by means of a short link 84 to a horizontally disposed slider or clamp block H mounted and supported from the underside of hanger bar 16 in position located spaced above the outer or forward side of the inner end base 15b of beam 15 and at the opposite side of the vertical axis $c$—$d$ between that axis and the depending strut 16b of the beam mounting base 16c of the hanger bar. The clamp block H is pivotally mounted at the lower end of a pivot pin 85 which depends from hanger bar 16 at the above referred to location and which provides a vertical pivot axis $h$ (see Fig. 16) about which the block H is horizontally rotatable. The short link 84 is slidably received in the clamp block H and at its forward end is pivotally coupled at the forward side of beam structure B to the inner or forward end of the long slider bar 80 by a vertical pivot pin 86 which provides a vertical pivot axis $i$ (see Fig. 16) about which such coupled ends of links 80 and 84 are horizontally rotatable relative to each other.

Attention is directed to the fact that the outer end of the short link 84 is positioned at the upper side of the long slider bar 80, so that, link 84 may be slid inwardly through the clamp block H to a position in which the pivot pin 86 is located beneath slider block H, even to a position in which pins 86 and 85 are in vertical alignment, without structural interference. Similarly, it will be noted that the clamp block E which mounts the long slider bar or link 80 on the slide CS is positioned completely below the horizontal plane of the upper surface of link 80, so that, the latter link may be adjusted inwardly relative to block E to a position in which the pivot pin 86 is above the block, even to a position of adjustment with pin 86 in vertical axial alignment with the pin 61 on which the block is mounted, without structural interference. The clamp blocks E and H of the linkage may be of any usual or desired construction by which the position of a slider bar or link may be adjusted and releasably clamped in an adjusted position, as will be familiar to those skilled in this art.

In the mounting of the linkage L on and relative to beam structure B and the slides TS and CS of beam 15 thereof in the present example, it will be noted that the fixed axis $h$ of the linkage on the beam structure is provided by the pivot pin 85 for clamp block H and that such fixed axis does not coincide or vertically axially align with the vertical axis $c$—$d$ about which beam structure B is horizontally swingable, but is offset outwardly and rearwardly not only from the vertical axis $c$—$d$ but also from the horizontal axis $a$—$b$, of the beam structure. However, to compensate for this offset, the axis $e$ provided by the pivot pin 61 of clamp block E on slide CS and the axis $g$ provided by pivot pin 83 which couples short link 81 to slide TS, are each similarly offset relative to the axes of cutter unit C and tracer unit T, respectively. Such offset of the fixed axis $h$ of the linkage L relative to the vertical axis $c$—$d$ about which the beam structure B is horizontally swingable is not a critical or essential factor in the movement transmitting mechanism of the invention, but is in the present example the result of structural expediency. It is to be understood therefor that, if desired or found expedient, the fixed axis of the linkage on the beam structure may be mounted coincident and in vertical alignment with the vertical axis $c$—$d$ for that structure, or may be offset, just so long as the exact offset in both direction and distance is also provided between the axes of the tracer unit T and the cutter unit C and the axes $e$ and $g$ by which the linkage is pivotally coupled to the slides TS and CS respectively.

Thus, the linkage L couples and associates the slides TS and CS with the beam structure B in such a manner relative to the vertical axis $c$—$d$ and the horizontal axis $a$—$b$ about which the beam structure is swingable with the slides as a unit, that reciprocation of either the slide TS or the slide CS on beam 15 will be transmitted to the other such slides as a movement thereof in the same direction but as either a reduced or enlarged scale movement relative thereto in accordance with the ratio of reduction or enlargement for which the linkage L has been adjusted. It will be noted that the vertical axis $c$—$d$ of pivot 16e of the beam structure and the vertical axes of the heads CH and TH of slides CS and TS are parallel and are always maintained in a straight line along and parallel with the straight line path of movement of heads CH and TH on beam 15 under all conditions of operation. For example, reciprocation of slide TS inwardly of beam 15 will rock long bar 80 inwardly of the beam about pivot 86 at the outer end of link 84 and will thus move slide CS with head CH, through the coupling of the slide to bar 80 by clamp block E, inwardly along beam 15 but at a scaled reduction to the movement of head TH on slide TS. The ratio of reduction will be dependent upon the position at which long bar 80 is adjustably set in the clamp block E and the resulting relation between the spacing between pivots 61 and 82 and pivots 61 and 86 on the long bar, and the position at which link 84 is adjustably set in clamp block H with the resultant spacing between fixed pivot 85 of the linkage on structure B and the pivotal connection 86 between link 84 and the adjacent end of long bar 80 at the forward side of beam 15. Outward movement of slide TS with head TH on beam 15 will cause outward movement of slide CS with head CH in the same manner and at a ratio of reduction in accordance with the ratio of reduction for which the linkage L has been set. It will be clear that, conversely, movements imparted to slide CS will be translated by the linkage as movements of the slide TS in enlarged scale at the ratio for which linkage L has been adjusted.

*Adjustment of the scaled movement transmitting linkage*

Referring particularly to Figs. 16, 17 and 18, the ratio of the movements of slides TS and CS in scaled relation to each other is determined by the adjustment of the distance between the axis $e$ at which the long slider bar 80 is coupled to slide CS and the axis $i$ at which the end of slider bar 80 at the forward side of beam 15 is pivotally connected with the link 84, and by the distance between such axis $i$ and the fixed axes $h$ on which the linkage is pivotally coupled to the beam structure B. The adjustments in axial distances on the linkage are effected by sliding the bar 80 and the link 84 through their respective clamp blocks E and H to adjusted positions therein, and then clamping bar 80 and link 84 in such adjusted positions. The greater the distances between axis $i$ and the axes $e$ and $h$, respectively, the smaller the scaled reduction of movements transmitted to the clamp block E and slide CS from movements of slide TS longitudinally along beam 15, while the smaller the distances between such axes, the greater the scaled reduction which will be obtained in movements of clamp block E and slide CS longitudinally along beam 15. And conversely, the greater the distances between such axes the smaller the amplification and the smaller the distances therebetween the greater the amplification, of movements transmitted to the slide TS by the linkage L from movements imparted to the slide CS longitudinally along beam 15.

In the machine of the illustrated example, the linkage L is adjustable for a range of reduction or enlargement ratios from the order of 2:1 to infinity, and as schematically illustrating such adjustment range I have shown in Fig. 16 of the drawings, the position of the linkage on and relative to beam 15 for a 2:1 ratio; in Fig. 17 the adjusted position for a ratio of the order of say 100:1 or higher, that is an adjustment approaching infinity; and in Fig. 18, I have shown an intermediate adjustment, say for a ratio of the order of 4:1.

As schematically illustrated by Fig. 16, with the adjustment of the linkage L for a 2:1 ratio of reduction or enlargement, the long link or slider bar 80 thereof is adjusted in clamp block E to a position with the pivot $e$ thereof spaced from pivot $i$ at the outer end of link 84 a distance equal to one-half ($\frac{1}{2}$) the length of long bar 80 between the pivots $i$ and $f$ of the linkage. In adjusting the linkage L for any desired ratio, the length of the bar 80 between pivots $i$ and $f$ is divided by the required reduction or enlargement and the bar 80 is then adjusted in clamp block E to position the pivot $e$ spaced a distance from pivot $i$ which is equal to the quotient resulting from such division. The adjustment of the linkage L for the required ratio, in this instance the 2:1 ratio, is then completed by adjusting link 84 in the clamp block H to space pivots $h$ and $i$ a distance apart equal to the quotient obtained by dividing the distance between the pivots $f$ and $g$ at the opposite ends of link 81, such distance being a fixed one, by the reduction required minus a constant of 1. Thus for the 2:1 ratio adjustment, the distance between pivots $f$ and $g$ is divided by the desired ratio of 2 minus a constant of 1, that is by 1, so that, link 84 is adjusted in clamp block H to space pivots $h$ and $i$ a distance apart equal to the distance of the space between the pivots $f$ and $g$ of link 81. The same adjustment formula is followed for adjusting and setting the linkage L for any desired ratio. If a 100:1 ratio is desired, the block E will be adjusted on bar 80 to position pivots $e$ and $i$ a distance apart equal to the quotient obtained by dividing the distance between pivots $i$ and $f$ by 100 (the required ratio), while block H will be adjusted on link 84 to position pivots $h$ and $i$ a distance apart equal to the quotient obtained by dividing the fixed distance between pivots $f$ and $g$ by the required ratio of 100 less the constant of 1, or 99.

Any adjustment of the movement transmitting linkage L to obtain movements of the heads TH and CH in scaled relation to each other "in or out" in either direction along the longitudinal axis of beam 15, will, due to the arrangement of the linkage and its mounting on and relative to beam 15 and to the horizontal axis $a$—$b$ and to the vertical axis $c$—$d$, about which beam structure B is swingable, automatically result in positioning the slides TS and CS on beam 15 to accurately locate the heads TH and CH at radial distances, respectively, from the axes of swing of the beam to obtain movements of heads TH and CH in the same scaled relation relative to each other when the beam structure B is swung vertically about horizontal axis $a$—$b$ or is swung horizontally about vertical axis $c$—$d$. For example, the adjustment of linkage L for a 2:1 ratio as schematically shown by Fig. 16, will automatically position the vertical axis of the cutter head CH on beam 15 so that such axis is located midway between the vertical axis $c$—$d$ about which beam 15 is horizontally swingable, and the vertical axis of the cutter head CH. Hence, as beam 15 is swung horizontally about the vertical axis $c$—$d$ laterally in either direction over and across tables W and P, the cutter A of a unit C mounted in head CH will move through a distance only one-half ($\frac{1}{2}$) the distance through which style S of tracer unit T in head TH is moved. Similarly, as the beam 15 is swung vertically about the horizontal axis $a$—$b$ to move tracer style S and cutter C in the third or "depth" dimension, the same condition will prevail and cutter C will be moved vertically through a distance which is one-half ($\frac{1}{2}$) the distance of vertical movement of the style S. So for any adjustment setting of the linkage L for movements of the tracer head TH and the cutter head CH longitudinally of the beam 15 relative to each other in scaled relation, the positioning of such heads by the adjustment of the linkage relative to each other and relative to the horizontal axis $a$—$b$ and the vertical axis $c$—$d$ of the beam structure B, will be such as to cause movements of the tracer head TH and cutter head CH in scaled relation relative to each other at the precise ratio for which the linkage L has been adjusted, when such heads are moved laterally by horizontal swinging of the beam structure and are moved vertically by vertical swinging of such structure. As a further example, when linkage L is adjusted for a 4:1 ratio as shown in Fig. 18, by adjusting the slider bar 80 and link 84 in the clamp blocks E and H, respectively, as hereinbefore explained, the heads CH and TH are not only adjusted relative to each other and the linkage so that movement of head TH longitudinally of beam 15, will move head CH in the same direction longitudinally of the beam a distance equal to one-fourth ($\frac{1}{4}$) the distance of movement of head TH, but are also located with the vertical axis of head CH spaced from vertical axis $c$—$d$ a distance equal to one-fourth ($\frac{1}{4}$) the distance of the distance of the spacing between axis $c$—$d$ and the vertical axis of the head TH, so that head CH is moved through a distance one-fourth ($\frac{1}{4}$) of the distance through which head TS is moved when beam structure B is swung bodily about the vertical axis $c$—$d$ or about the horizontal axis $a$—$b$.

Single adjustment point form of the movement transmitting linkage

In Figs. 14, 19, 20 and 21, I have disclosed a form of scaled movement transmitting linkage L' for the tracer head TH and cutter head CH on beam 15 which is capable of adjustment from a single adjustment point, so that, the linkage may be set for any ratio within the capacity of a machine by a single setting thereof. This linkage L' embodies the basic organization of the linkage L and includes a long link or slider bar 80' adjustably mounted in the clamp block E carried by the slide CS with link 87' pivotally connected by pivot pin 82' to the rear outer end of link 80' and extending forwardly across bar 15 to and being pivotally connected at its forward end by pivot pin 83' to the slide TS on beam 15. The end of bar 80' at the forward side of beam 15 is connected to the forward end of link 84' by a pivot pin 86', and this link extends rearwardly to and is slidably mounted in the clamp block H rotatably suspended from the fixed pivot 85 which is mounted on hanger bar 16 of the beam structure B. The linkage L' thus provides a pantograph mechanism of the parallelogram linkage type.

The link 81' is extended rearwardly a distance beyond the rear of the long slider bar 80' and its pivot pin 82' and an added long link 87 is pivotally connected to the rear end of link 81' by a pivot pin 88. The long link 87 extends forwardly and inwardly from pivot pin 88 and across beam 15 to the underside of link 84' where it is pivotally connected thereto by a pivot pin 89 (see Figs. 19, 20 and 21). The center or axis of pivot pin 89 is spaced from the axis of pivot pin 86' which connects the forward end of link 84' to the long slider bar 80' a distance equal to the distance between the axis of pivot pin 82' and the axis of pivot pin 88 by which the rear ends of bar 80' and long link 87 are connected respectively to the link 81'. Thus long link 87 is at all times maintained in parallelism with the long bar 80' and forms therewith and with the links 81' and 84', a parallelogram linkage.

In order to adjust and set the linkage L' for any desired ratio of reduction or enlargement, it is only necessary to make one adjustment from a single adjustment point. Adjustment of the linkage is effected by loosening clamp blocks H and E and then adjusting and setting the long slider bar 80' in clamp block E in accordance with the formular hereinabove explained in connection with adjustment of the linkage L. The adjustment of clamp block E on the long slider bar 80' will through the medium of the long link 87 connected between links 81' and 84' and parallel with link 80' as above explained, cause the clamp block H and link 84' to automatically adjust and set themselves for the ratio at which clamp block E is adjusted on slider bar 80'. This automatic setting of link 84' in clamp block H results because the centers of the pivot pins 85, 61, and 83' are confined and maintained at all times in a straight line along beam 15 parallel with the longitudinal axis of such beam.

In Figs. 19, 20 and 21, I have schematically disclosed positions of adjustment of the linkage L' corresponding with the positions shown in Figs. 16, 17 and 18, in connection with the linkage L, namely adjustment positions for ratios of 2:1; 100:1 or higher and 4:1, respectively.

*General operation*

The operation of the machine embodying the various features of my invention as expressed in the illustrated example, in carrying out reduced or enlarged scale engraving or reproducing operations in three dimensions on a work piece from a master or pattern, will be clear from the description and explanations set forth hereinabove.

In reproducing in three dimensions, referring now to Fig. 1 in particular, a three dimensional master $p$ is secured on the table P in position for scanning by style S of tracer unit T, and a work piece $w$ is mounted in position on work table W for operative engagement by the engraving cutter A of cutter unit C. It is essential in three dimensional work to have the point of the cutter A in line with and in the same horizontal plane as the point of the tracer style S so as to insure precise reduction by the cutter A in the third or so called "depth" dimension. Hence, the cutter unit C is accurately vertically adjusted through the medium of the cutter to so position its point relative to the point of style S, vertical adjustment pin 63 (see Fig. 6).

The locking bolt 26 is released from locking engagement with the flange 20b of link member 17 (see Fig. 5) to permit free vertical swinging of the beam structure B about its horizontal axis $a$—$b$. Then the counterbalancing spring unit 20 may be adjusted and set by means of the adjusting spring 24 and screw 25 (see Fig. 5) to obtain the desired degree of counterbalancing of the weight of beam structure B about the horizontal axis $a$—$b$ to suit the requirements of any particular operator.

The movement transmitting linkage L (or the single adjustment point linkage L') may then be adjusted and set for the desired ratio of reduction or enlargement, in the manner hereinbefore described in detail. A linkage L or L' is infinitely adjustable within a range from say 2:1 to infinity, as exemplified by the adjustment diagrams of Figs. 16 to 21 inclusive. With the movement transmitting linkage L (or L') adjusted for the required ratio, the operator may then start the operation of reproducing from the three dimensional pattern $p$, a three dimensional replica thereof in the work piece $w$.

With the cutter spindle drive including the spindle driving belt 72 operating, the operator scans and follows the pattern $p$ with the style S, traversing and covering the entire surfaces and contours of the pattern. As the operator moves the tracer unit T over the pattern $p$ in a direction longitudinally of the machine, tracer head TH and slide TS are moved longitudinally of the beam 15 and, through linkage L, will correspondingly move slide S and cutter unit C in head CH but in scaled relation to the movements of tracer unit T at the ratio for which the linkage L is set. Thus, the machine is caused to reproduce in one of the lateral dimensions. As the operator moves the tracer unit T across the pattern $p$ in a direction in or out relative to the machine, the beam structure B is rotated bodily about the vertical axis $c$—$d$ thereof and as hereinbefore explained cutter head CH with cutter unit C will have been positioned on beam 15 relative to tracer head TH and the vertical axis $c$—$d$ so that the cutter unit CH will be moved to move cutter A over and in operative engagement with the work piece $w$ in precise scaled relation to the movements of tracer head TH at the ratio for which linkage L has been set. In this manner, the machine engraves or reproduces in the other horizontal or lateral dimension. As the style S of tracer unit T moves over and scans the three dimensional pattern $p$ in the lateral dimensions, it follows the pattern $p$ in the third or depth dimension and causes vertical bodily swinging of the beam structure B upwardly and downwardly about the horizontal axis $a$—$b$, thus causing cutter head CH to correspondingly move in the third or so called "depth" dimension in scaled relation to the movements of tracer head TH and in precise accordance with the ratio for which the linkage L has been set.

This is so because the adjustment of linkage L automatically adjusts cutter head CH and tracer head TH on and along beam 15 relative to each other and to the horizontal axis a—b for scaled movements relative to each other at such ratio. Obviously, various compound movements in any two or all three dimensions may be effected by the organization as disclosed in the illustrated example.

For two dimensional reproduction or engraving with the machine of the example, the beam structure B is locked in horizontally disposed position by the locking bolt 26, after which the beam structure is freely rotatable horizontally about the vertical axis c—d but is held against vertical rotation about the horizontal axis a—b. When so set, two dimensional reproduction is carried out in one dimension by reciprocation of the heads TH and CH on and longitudinally along the beam and in the other dimension by horizontal swinging bodily of the beam structure B about the vertical axis c—d.

It is to be noted that by a reproducing or engraving organization of the invention, the work table W and pattern table P may be mounted disposed longitudinally along and across the machine beneath the beam structure B in position readily accessible to an operator at the front of the machine, as well as placing a master and work piece when mounted on the tables in position readily visible to the operator. And it is also to be noted that notwithstanding the range of reduction or enlargement ratios possible to the machine, that is from approaching a ratio of 1:1 to infinity, the size and area of a master which can be used on the copy table P, is not effected or limited within the capacity of such table for any particular machine.

The machine of the invention may be as readily employed for enlarging engraving or reproducing from a master as for reproducing operations. It is only necessary to interchange the cutter unit C and tracer unit T in the heads CH and TH in a manner hereinbefore explained. In such interchanged mounting of the heads TH and CH, the same cutter spindle drive which includes the belt 71 and the push pull rod 72, may be utilized for driving the cutter spindle with the cutter unit CH mounted in the head TH at the outer end of beam 15.

In addition to the foregoing examples of embodiments and mechanical expressions of the various organizations and mechanisms, and the combinations and sub-combinations thereof, it will be evident that various other embodiments, mechanical expressions, constructions and combinations and sub-combinations may be resorted to without departing from the broad spirit and scope of my invention and hence, I do not desire or intend to limit and restrict my invention in all respects to the specific disclosures hereof as illustrated and described herein by way of example, except as may be required by specific intended limitation thereto in any of the appended claims.

What I claim is:

1. In a three dimensional reproducing machine, in combination, a beam structure pivotally mounted at one end thereof for lateral swinging bodily about an axis perpendicular to the plane of lateral swing and for swinging bodily in a plane perpendicular to the plane of lateral swing about an axis perpendicular to the axis of lateral swing, slide units mounted on said beam structure for reciprocation thereon independently thereof and relative to each other in a straight line path along the longitudinal axis of said structure, a fixed pivot on said beam structure at the pivoted end of such structure, each of said slides being provided with a pivot thereon parallel with said fixed pivot on the beam structure, movement transmitting mechanism pivotally connected between said fixed pivot and said slide pivots for causing movements of said slides in scaled relation to each other, said mechanism embodying a clamp block pivotally mounted on said fixed pivot, a link member mounted in said clamp block for adjustment therein longitudinally of the link and extending forwardly from said beam structure, a link pivotally mounted on the pivot on the outermost of said slides and extending rearwardly across said beam structure, a clamp block pivotally mounted on the pivot on the innermost of said slides, a bar member mounted in the clamp block on said innermost slide and being adjustable therein longitudinally of the member, said bar member being extended across said beam structure with its rear end pivotally connected to the link on said outermost slide unit intermediate the ends of said link and being connected at its forward end with the forward end of said link in the clamp block on said fixed pivot on the pivoted end of said beam structure, and a second bar member parallel with said first mentioned bar member and being pivotally connected between the rear end of the link on said outermost slide unit and a location intermediate the ends of said link mounted in said fixed pivot clamp block.

2. In combination, a beam structure pivotally mounted at one end thereof for lateral swinging about an axis perpendicular to the plane of lateral swing; slide units mounted on said beam structure for reciprocation thereon relative to each other; means constraining said units to relative movements on said beam structure in either direction along a straight line path longitudinally of said structure; a fixed pivot on said beam structure at the pivoted end thereof parallel with the axis of lateral swing of said beam structure; movement transmitting linkage pivotally connecting said slide units, respectively, with said fixed pivot; said linkage including, a bar member extending across said beam structure, a block member pivotally mounted on the innermost of said slide units on an axis substantially parallel with said fixed pivot on said beam structure, said bar member being mounted on said block member for adjustment therein longitudinally of the bar member; a link member of fixed length pivotally connecting the outermost of said slide units with the adjacent end of said bar member, a block member pivotally mounted on said fixed pivot axis on the beam structure, a link member mounted on said fixed pivot axis mounted block member and being extended outwardly to and pivotally connected with the adjacent end of said bar member, and said latter link member being adjustable longitudinally in said block member.

3. In combination, a beam structure, a fixed pivot on said beam structure adjacent one end thereof; an outer member and an inner member on said beam structure at one side of said fixed pivot; said members being mounted for reciprocation on said beam structure relative to each other toward and from said fixed pivot; a pivot on said outer member; a pivot on said inner member; said member pivots being mounted with their axes parallel to the axis of said fixed pivot;

a pantograph linkage pivotally mounted on said fixed pivot in position extending therefrom in a plane generally perpendicular to the axes of said members; said pentograph linkage being pivotally connected to said pivots, respectively, on said inner and outer members for reciprocating said inner member in scaled reduction to reciprocation of said outer member; means constraining said inner and outer members to reciprocate along a straight line intersecting the axes of said fixed pivot and said member pivots, respectively; said fixed pivot being mounted in position spaced laterally from and clear of the path of reciprocation on said beam of said members; and means for adjusting said pantograph linkage to adjust said members within a range of adjustment between a position with said inner member pivot at said fixed pivot and a position with said members spaced outwardly a maximum distance from said fixed pivot.

4. The combination with a beam mounted for lateral swinging about an axis perpendicular to the plane of lateral swing, an outer member and an intermediate member mounted on said beam at one side of and spaced from the axis of lateral swing, and a fixed pivot on said beam at said axis of lateral swing, of; a parallelogram linkage comprising parallel bars and parallel links pivotally connecting opposite ends, respectively, of said bars, one of said links being pivotally mounted on the fixed pivot on said beam, the other of said links being pivotally connected to the outer reciprocal member on said beam, the other of said bars being pivotally connected to said intermediate reciprocal member, and means constraining reciprocation of said members to a straight line intersecting the axes of said members and the axis of lateral swing of said beam.

5. The combination with a beam structure mounted for lateral swinging about an axis perpendicular to the plane of lateral swing, an outer member and an intermediate member mounted on said beam structure at one side of and spaced from the axis of lateral swing, and a fixed pivot on said beam structure at said axis of lateral swing, of; an adjustable pantograph linkage pivotally mounted on the fixed pivot on said beam structure and being extended across said structure to and pivotally connected with said outer member and intermediate member, respectively, for causing by movements of said outer member movements of said intermediate member in scaled reduction, means constraining reciprocation of said members to a straight line intersecting the axes of said members and of lateral swing of said beam, and means for adjusting said pantograph linkage to relatively adjust said members to infinite positions of adjustment within a range between a position of maximum inward movement with the intermediate member at said fixed axis on the beam structure and a position of maximum outward movement of said members on said structure.

6. The combination with a beam structure, a fixed pivot on said structure, an outer member and an inner member mounted for reciprocation on said beam structure relative to each other toward and from said fixed pivot, of; an adjustable pantograph linkage pivotally mounted on said fixed pivot on said beam structure and being extended therefrom to and pivotally connected with said outer and intermediate members, respectively, for effecting reciprocation of said intermediate member in scaled reduction relative to reciprocation of said outer member, means constraining reciprocation of said outer and intermediate members to a straight line intersecting the axes thereof and the axis of said fixed pivot, said intermediate member being mounted on said beam structure for movement to a position thereon at said fixed pivot, said pantograph linkage being adjustable to relatively adjust said members to infinite positions of adjustment along said beam structure between a position of maximum inward movement with the intermediate member at said fixed pivot and a position of maximum outward movement on said beam structure from said fixed pivot, means for adjusting said pantograph linkage, and said adjusting means including a member providing a single operating point for effecting complete adjustments of said pantograph mechanism and members throughout the maximum range of adjustment thereof.

7. In a three dimensional reproducing machine, in combination, a link member pivotally mounted for vertical rocking about a horizontal axis, a beam structure pivotally mounted on said link member for lateral swinging thereon in a horizontal plane about a vertical axis, said beam structure being swingable in a vertical plane with said member as a unit about said horizontal axis, said beam structure including a horizontally disposed beam member positioned below the vertical axis of pivotal mounting of said beam structure on said link member, slides mounted on said beam member for relative reciprocation thereon independently thereof longitudinally of said beam member, a fixed pivot on said beam member at the vertical axis of pivotal mounting of the beam member on said link member, pivots on said slides, respectively, and a movement transmitting linkage pivotally connected between said pivots on said slides, respectively, and said fixed pivot on said beam member adapted to cause movements of said slides along said beam member in scaled relation to each other.

THEODORE F. ESERKALN.

REFERENCES CITED

The following references are of record in the file of this patent:

UNITED STATES PATENTS

| Number | Name | Date |
|---|---|---|
| 115,669 | Westworth | June 6, 1871 |
| 1,351,211 | Keller | Aug. 31, 1920 |
| 1,754,256 | Braren | Apr. 15, 1930 |
| 1,964,319 | Gorton et al. | June 26, 1934 |
| 2,067,962 | Zwick | Jan. 19, 1937 |
| 2,176,193 | Zwick | Oct. 17, 1939 |
| 2,178,131 | Zwick | Oct. 31, 1939 |
| 2,198,635 | Rossman | Apr. 30, 1940 |
| 2,230,442 | Arms | Feb. 4, 1941 |
| 2,247,462 | Zwick | July 1, 1941 |
| 2,278,262 | Hoelscher | Mar. 31, 1942 |
| 2,451,359 | Schlicksupp | Oct. 12, 1948 |
| 2,472,151 | Ewaldson | June 7, 1949 |

FOREIGN PATENTS

| Number | Country | Date |
|---|---|---|
| 418,135 | Great Britain | Oct. 18, 1934 |